United States Patent [19]
Shimada

[11] Patent Number: 6,002,383
[45] Date of Patent: Dec. 14, 1999

[54] POLYMER DISPERSED LIQUID CRYSTAL (PDLC) FILM USING HEAT OR AN ELECTRIC FIELD TO CHANGE STATE AND THE OTHER TO CHANGE BACK

[75] Inventor: Naoki Shimada, Tokyo-To, Japan

[73] Assignee: DAI Nippon Printing Co., Ltd., Japan

[21] Appl. No.: 08/624,316

[22] Filed: Mar. 28, 1996

[30] Foreign Application Priority Data

| Mar. 30, 1995 | [JP] | Japan | 7-095940 |
| Apr. 11, 1995 | [JP] | Japan | 7-109141 |
| Jun. 15, 1995 | [JP] | Japan | 7-171647 |

[51] Int. Cl.$^6$ .......................... G09G 3/36; C09K 19/52; G06K 5/00
[52] U.S. Cl. ..................... 345/87; 252/299.01; 235/380
[58] Field of Search ............................ 345/87, 105, 106; 349/86, 70, 19, 20, 21, 22; 347/171, 179; 428/1; 430/20; 252/299.01; 359/490, 491; 346/76.1; 257/679, 922; 902/26; 235/380, 381, 382, 382.5

[56] References Cited

U.S. PATENT DOCUMENTS

| 5,055,662 | 10/1991 | Hasegawa | 235/380 |
| 5,384,069 | 1/1995 | Yoshinaga et al. | 252/299.01 |
| 5,412,192 | 5/1995 | Hoss | 235/380 |
| 5,450,491 | 9/1995 | McNair | 380/25 |
| 5,471,044 | 11/1995 | Hotta et al. | 235/380 |
| 5,559,314 | 9/1996 | Ohno et al. | 235/432 |
| 5,589,237 | 12/1996 | Akashi et al. | 252/299.01 |
| 5,620,781 | 4/1997 | Akashi et al. | 252/299.01 |
| 5,693,421 | 12/1997 | Kamiyama et al. | 428/1 |
| 5,712,066 | 1/1998 | Yoshinaga et al. | 430/20 |

FOREIGN PATENT DOCUMENTS

| 0752323 | 1/1997 | European Pat. Off. |
| 3324770 | 1/1984 | Germany |

OTHER PUBLICATIONS

Patent Abstracts of Japan, vol. 18, No. 83 (M–1558) Feb. 10, 1994, JP 5–294092.
Patent Abstracts of Japan, vol. 18, No. 36 (P–1678) Jan. 19, 1994, JP 5–264953.
Patent Abstracts of Japan, vol. 18, No. 346 (P–1762), Jun. 29, 1994, JP 6–084210.
Patent Abstracts of Japan, vol. 18, No. 657 (P–1842), Dec. 13, 1994, JP 6–258622.

*Primary Examiner*—Jeffery Brier
*Assistant Examiner*—Paul A. Bell

[57] ABSTRACT

There is disclosed an information displaying medium having a base member and a writable displaying unit disposed thereon. The writable displaying unit has a reversible displaying element including a polymer/liquid crystal composite film. A processing means including a control means and an information recording unit is buried in the base member and functions as a semiconductor device. A communication means is buried in the base member for exchanging signals with an external apparatus.

24 Claims, 6 Drawing Sheets

POLYMER DISPERSED LIQUID CRYSTAL (PDLC) FILM USING HEAT OR AN ELECTRIC FIELD TO CHANGE STATE AND THE OTHER TO CHANGE BACK

TECHNICAL FIELD

The present invention relates to an information displaying medium to which information can be repeatedly written, a writable displaying labeling sheet for making the information displaying medium, and a writable displaying transfer sheet.

BACKGROUND OF THE INVENTION

An information displaying medium is a promising information transfer means formed by providing a card, i.e., a base sheet, with a repeatedly writable displaying unit and capable of displaying different pieces of information as occasion demands. The information displaying medium when used, for example, as a customer card, services to the customer can be improved by displaying messages and such on the information displaying medium.

Various writable, reversible displaying elements intended for use for forming writable displaying unit have been proposed. Heat, light or magnetism is used for recording information on and erasing recorded information from the reversible displaying element. A reversible displaying element employs a fatty acid dispersed polymer film formed by dispersing a fatty acid that changes its phase between an opaque phase and a transparent phase in a polymer matrix. Another reversible displaying element uses the reversible opening and closing of lactone rings of a leuco dye by a developer/subtracter agent. A third reversible displaying element employs a polymer liquid crystal. A fourth reversible displaying element employs microcapsules containing magnetic powder.

The visibility of those known reversible displaying elements will be examined. The reversible displaying element employing a leuco dye indicates blue images on a white background and becomes light blue in an erased state. The reflection densities of the background, the images and the erased state measured by a Macbeth reflection densitometer (RD-918) are about 0.1, about 1.5 and about 0.3, respectively. Although the initial visibility is satisfactory, residual images remain after erasing. The reversible displaying element employing a fatty acid dispersed polymer film indicates white images of 0.4 in reflection density on the background of 1.2 in reflection density having metallic luster and has metallic luster in an erased state of 1.2 in reflection density. White characters displayed on the background having metallic luster is difficult to recognize and the visibility of the reversible displaying element is unsatisfactory.

The reversible displaying element employing microcapsules containing magnetic powder displays black images of 1.5 in reflection density on a silvery background of 1.0 in reflection density and becomes silvery in an erased state of 1.0 in reflection density. The visibility of black characters on the silvery background is unsatisfactory.

The reversible displaying element employing a polymer/ liquid crystal composite film, when used in combination with a black dichroic dye, displays black images of 1.4 in reflection density on a white background of 0.5 in reflection density and becomes white in an erased state of 0.5 in reflection density. Black characters displayed on the white background are easy to recognize, the visibility of the reversible displaying element is excellent and residual images may not remain after erasing.

SUMMARY OF THE INVENTION

The present invention has been made taking into consideration the foregoing conditions and it is therefore an object of the present invention to provide an information displaying medium to which information can be repeatedly written and information can be displayed in an excellent visibility, a writable displaying labeling sheet, and a writable displaying transfer sheet.

According to a first aspect of the present invention, an information displaying medium comprises a base member, a semiconductor information recording device buried in the base member, and a writable displaying unit formed on the base member and permitting repeated recording and erasing of visible information, in which the writable displaying unit is provided with a reversible display element which is changed from either of a recorded state and an erased state to the other by the agency of an electric field and from the latter state to the former state by the agency of heat.

According to a second aspect of the present invention, an information displaying medium comprises a base member, a writable displaying unit formed on the base member and permitting repeated recording and erasing of visible information, in which the writable displaying unit is provided with a reversible displaying element which is changed from one of a recording state and an erased state to the other by the agency of an electric field and from the latter state to the former state by the agency of heat, and the reversible displaying element has at least a labeling base sheet, a writable polymer/liquid crystal composite film formed on the outer surface of the base sheet, and an adhesive layer formed on the inner surface of the base sheet so as to be adhesively attached to the base member.

According to a third aspect of the present invention, an information displaying medium comprises a base member, and a writable displaying unit formed on the base member and permitting repeated recording and erasing of visible information, in which the writable displaying unit is provided with a reversible displaying element which is changed from one of a recording state and an erased state to the other by the agency of an electric field and from the latter state to the former state by the agency of heat, and the reversible displaying element has at least a writable polymer/liquid crystal composite film, and an adhesive layer formed on the inner surface of the polymer/liquid crystal composite film so as to be adhesively attached to the base member.

According to a fourth aspect of the present invention, a writable displaying labeling sheet comprises a labeling base sheet, a writable polymer/liquid crystal composite film formed on one of the surfaces of the labeling base sheet, and an adhesive layer formed on the other surface of the labeling base sheet.

According to a fifth aspect of the present invention, a writable displaying transfer sheet comprises a removable support member, a writable polymer/liquid crystal composite film formed on the removable support member, and an adhesive layer formed on the polymer/liquid crystal composite film.

According to the first aspect of the present invention, visible information can be repeatedly written to the writable displaying unit provided with the reversible displaying element and, at the same time, pieces of information can be stored on the semiconductor information recording device.

According to the second and the fourth aspect of the present invention, the writable displaying unit having the reversible displaying element provided with the polymer/ liquid crystal composite film and permitting repeated writing and erasing of visible information can be formed on the base member by adhesively attaching the writable displaying labeling sheet to the base member.

According to the third and the fifth aspect of the present invention, the writable displaying unit having the reversible displaying element provided with the polymer/liquid crystal composite film and permitting repeated writing and erasing of visible information can be formed on the base member by adhesively attaching the writable displaying transfer sheet to the base member and removing the removable support member from the writable displaying transfer sheet.

DETAILED DESCRIPTION OF THE PREFERRED EMBODIMENTS

First Embodiment

A first embodiment of the present invention will be described with reference to the accompanying drawings.

Figure 1:
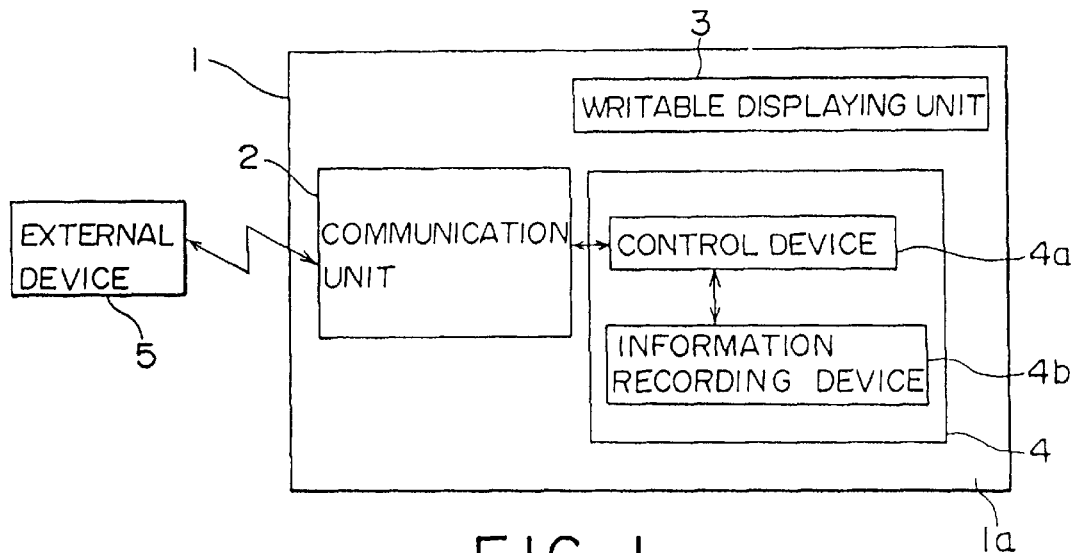
FIG. 1 is a block diagram of an information displaying medium in a first embodiment according to the present invention.

FIGS. 1 to 4 illustrate an information displaying medium 1 in a first embodiment of the present invention. Referring to FIG. 1, the information displaying medium 1 has a card (base member) 1a, a communication unit 2 incorporated into the base member 1a and capable of exchanging information signals by radio with an external device 5, a writable displaying unit 3 on which visible information, such as an image, is made by an external writing device, not shown, and a processing unit 4 connected to the communication unit 2 and capable of processing information signals to be transmitted and those to be received by the communication unit 2 and of controlling the general operations of the information displaying medium 1. The communication unit 2 and the processing unit 4 constitute a non-contact information recording device, and the writable displaying unit 3 serves as a displaying device.

The processing unit 4 has a control device 4a, such as a CPU, and a semiconductor storage device 4b for storing control programs and information to be transmitted and received, such as a ROM or an EEPROM. The information displaying medium 1 can be constructed by incorporating the communication unit 2 and the writable displaying unit 3 into a well-known IC card.

Figure 2A:
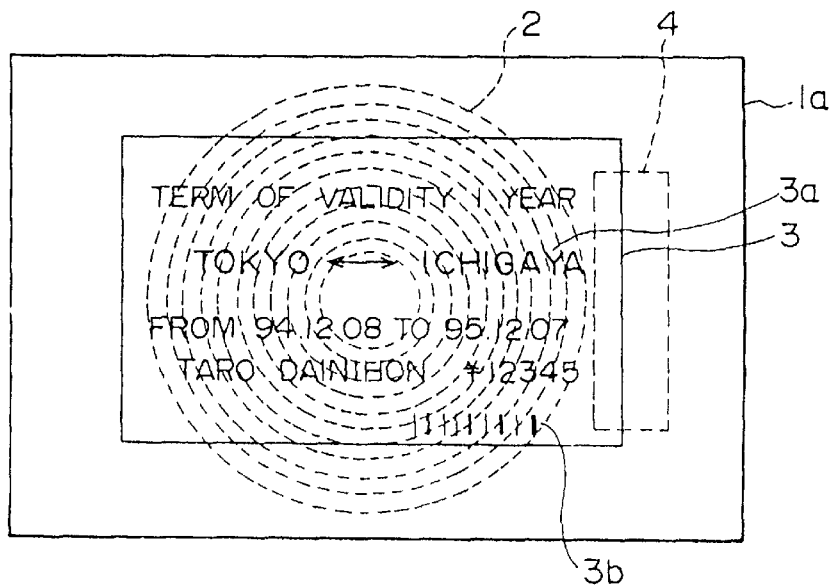
FIG. 2A is a plan view of the information displaying medium of FIG. 1.
Figure 2B:
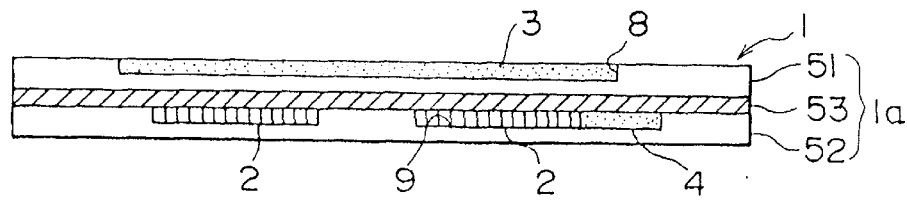
FIG. 2B is a sectional view taken on line B—B in FIG. 2A.

FIGS. 2A and 2B show the information displaying medium 1 in the form of a commuter ticket. The base member 1a is constructed by adhesively joining together an upper base part 51 and a lower base part 52 with an adhesive layer 53. The writable displaying unit 3 provided with a reversible displaying element 30 (FIG. 3) is buried in a recess 8 formed in the central region of the upper surface of the upper base part 51 so that its upper surface is substantially flush with the upper surface of the upper base part 51 or at a height in the range of 0 to 0.5 mm from the upper surface of the upper base part 51. The communication unit 2 provided with an antenna is buried in the central portion of the lower base part 52, and the processing unit 4 including a CPU and a RAM or the like is buried near the communication unit 2 in the lower base part 52.

The communication unit 2 and the processing unit 4 are buried in a recess 8 formed in the lower base part 52. Thus the communication unit 2 and the processing unit 4 are buried and concealed in the base member 1a formed by joining together the upper base part 51 and the lower base part 52. Therefore, the writable displaying unit 3 can be positioned at an any suitable position on the base member 1a regardless of the positions of the communication unit 2 and the processing unit 4.

The writable displaying unit 3 of the information displaying medium 1 may be formed in a portion of one surface of the base member 1a as shown in FIG. 2A, in the entire area of one surface of the base member 1a or in the both surfaces of the base member 1a. The position of the writable displaying unit 3 on the base member 1a may be determined selectively taking into consideration the purpose of the information displaying medium 1.

When issuing the information displaying medium (commuter ticket) 1, initial information is recorded on the information recording device 4b, and required conditions including the user's name, the commutation section and the term of validity are recorded and displayed on the writable displaying unit 3. Characters spelling the user's name and such and graphic information 3a may be displayed on the writable displaying unit 3. Machine-readable information, such as represented by a bar code, may be displayed.

When passing a ticket barrier, the user does not need to take out the information displaying medium 1 from a case, not shown; signals are transmitted by radio between the communication unit 2 of the information displaying medium 1 and the external device 5 installed at the ticket barrier to examine the contents of the information displaying medium 1 to examine the validity of the information recorded on the information storage device 4b, such as the commutation section and the term of validity.

The information displaying medium 1 whose validity has expired is recovered, initial information is stored again on the information storage device 4b, the information displayed on the writable displaying unit 3 is erased, and new information is written to the writable displaying unit 3 to make the information displaying medium 1 valid again.

The writable displaying unit 3 having the reversible displaying element 30 will be described in detail.

Figure 3:
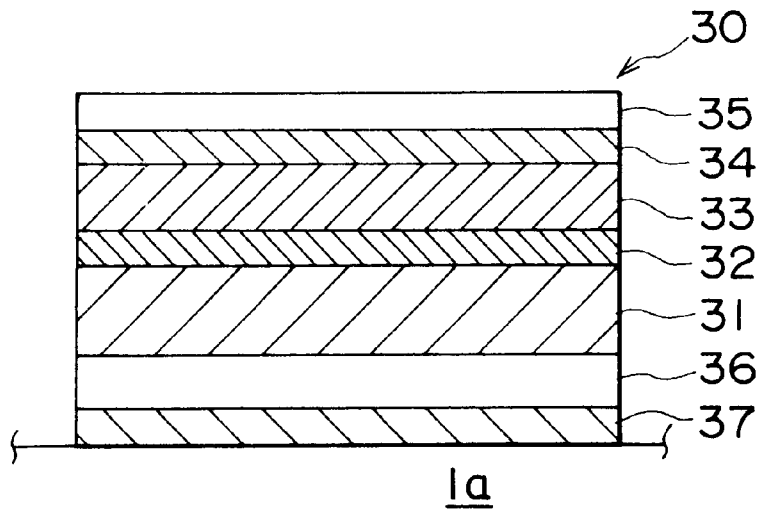
FIG. 3 is a longitudinal sectional view of a reversible displaying element provided with a PDLC film.

Referring to FIG. 3, the reversible displaying element 30 has a polymer/liquid crystal composite film (PDLC) 33 requiring both heat and an electric field for writing and erasing. The polymer/liquid crystal composite film 33 is formed by dispersing a smectic liquid crystal in a polymer matrix and is called also a PDLC film (polymer dispersed liquid crystal film).

As mentioned above, the reversible displaying element 30 having the PDLC film 33, as compared with other types of reversible displaying elements, is capable of displaying images in an excellent visibility. The visibility can be further improved by using a dichroic dye in combination with the liquid crystal to form the PDLC film 33. The principle of recording visible information on and erasing visible information from the PDLC film 33 uses light scattering and light transmission (change in the light absorptive power of the dichroic dye when the dichroic dye is used in combination with the liquid crystal and guest-host effect is available) due to the orderly change of the orientation state of the liquid crystal molecules caused by heat and an electric field (heat-electric field mode) between a regular orientation state, i.e., a homeotropic orientation or homogeneous orientation state, and an irregular orientation state, i.e., a random orientation state. When an opaque state (light scattering state) is used as a recording state and a transparent state (light transmitting state) is used as an erased state, information can be written to the PDLC film 33 with a thermal head capable of spot-heating and information can be erased by holding the PDLC film 33 between electrodes.

When writing information to the reversible displaying element 30 having the PDLC film 33, both an erasing operation and a writing operation are necessary, which needs to use two kinds of external energy. Accordingly, the information written to the reversible displaying element 30 cannot be easily altered dishonestly and does not fade away naturally in the natural environment. Therefore, the reversible displaying element 30 having the PDLC film 33 may be suitable for purposes in which security against the dishonest alteration of the displayed information is important. Other reversible displaying elements on which information can be rewritten only by heat (heat-heat mode), such as those employing a polymer fatty acid dispersed film, a leuco dye or a polymer liquid crystal, and reversible displaying elements to which information can be written only by magnetism, such as those employing microcapsules containing magnetic powder, are readily subject to dishonest alteration and provide low security against the dishonest alteration of information.

Since the orderly orientation state of the PDLC film 33 can be quickly established in a time on the order of microseconds by applying an electric field to the PDLC film 33, the reversible displaying element 30 has an excellent ability to enable quick writing and withstands a sufficiently large number of writing cycles.

A PDLC film proposed in, for example JP-A No. 4-71899 may be used as the PDLC film 33. A PDLC film employing a microcapsulated liquid crystal has excellent properties such that the liquid crystal does not exude because the liquid crystal is sealed in microcapsules. Films proposed by the applicant of the present patent application in JP-A Nos. 5-301489, 6-33283, 6-44735 and 6-119702 may be used as the PDLC film 33.

The polymer matrix binding the liquid crystal dispersed therein to form the PDLC film 33 is, for example, a vinyl chloride resin, a polymethacrylate resin, an acrylic resin, such as an acrylate-methacrylate copolymer, a polyvinyl alcohol resin, a polycarbonate resin, a polyester resin, an epoxy resin, a polyamide resin, a polyurethane resin, a polythiol resin, a radiation-setting resin that sets when exposed to ultraviolet rays or electron rays or a combination thereof.

The liquid crystal employed in the PDLC film 33 may be a smectic liquid crystal, a discotic liquid crystal, a nematic liquid crystal, a cholesteric liquid crystal, a polymer liquid crystal or a mixture of some of those liquid crystals. The visibility can be improved by mixing the liquid crystal with an appropriate amount of a dichroic dye to enhance the displaying contrast by the guest-host effect.

The liquid crystal can be dispersed in the polymer matrix by any one of a phase separation method, an emulsion method, a microcapsule method, a solvent evaporation method and a suspension polymerization method. Among those methods, a emulsion method and a microcapsule method are most preferable because those methods prevents the liquid crystal from exuding. The microcapsule method improves the durability of the dispersed liquid crystal particles. A microcapsule method using an in situ polymerization process is able to form the PDLC film 33 containing liquid crystal particles of 10 μm or below in particle size, which is suitable for forming the PDLC film 33 in a practically appropriate thickness and for securing a satisfactory display quality.

Generally, the thickness of the PDLC film 33 is in the range of about 3 to about 23 μm. The lower limit thickness of the PDLC film 33 is dependent on displaying contrast and the upper limit thickness of the same is dependent on a practical driving voltage necessary for setting the liquid crystal of the PDLC film 33 in a regularly oriented state.

The layered structure of the reversible displaying element 33 having the PDLC film 33 comprises at least the PDLC film 33 and an electric field applying device capable of applying an electric field perpendicularly to the PDLC film 33. Although the electric field applying device may be formed of conductive layers formed on the opposite surfaces of the PDLC film 33, an electric field can be applied to an optional portion of the PDLC film 33 when a conductive layer 32 is formed only on the back surface of the PDLC film and the front surface is brought into contact with an external electrode, not shown, or the like. Therefore, the reversible displaying element 30 comprises, at least, a base sheet 31, i.e., a substrate, the conductive layer 32 and the PDLC film 33. A protective layer 35 may be formed on the PDLC film 33 when necessary.

The label-shaped reversible displaying element 30 having the PDLC film 33 and provided on its back surface with an adhesive layer will be described in detail with reference to FIG. 3. As shown in FIG. 3, the reversible displaying element 30 has the conductive layer 32, the PDLC film 33, an intermediate layer 34 and the protective layer 35 formed sequentially in that order on the base sheet 31, and a cushion layer 36 and an adhesive layer 37 formed sequentially in that order on the back surface of the base sheet 31. The reversible displaying element 30 is attached adhesively to the base member 1a with the adhesive layer 37 to provide the writable displaying unit 3.

Primer layers may be interposed between the layers 31, 32, 33, 34, 35, 36 and 37 to enhance the adhesion between those layers. The reversible displaying element may be formed on the base member 1a by sequentially forming the layers 31 to 37 on the base member 1a by a printing method, such as a silk-screen printing method, a transfer printing method and a coating method instead of attaching a labeling sheet having the reversible displaying element 30 to the base member 1a. When the conductive layer 32 is formed of aluminum, the conductive layer 32 functions as a reflecting layer which improves the visibility of the writable displaying unit 3 comprising the reversible displaying element 30.

The base sheet 31 of the reversible displaying element 30 shown in FIG. 3 is a sheet of a polyester resin, such as polyethylene terephthalate, a polyvinyl chloride resin, a polyolefin resin, such as polypropylene, a cellulose resin, an acrylic resin, paper or synthetic paper having a thickness in the range of about 50 to about 1000 μm. A single sheet may be used both as the base sheet 31 and the base member 1a of the information displaying medium 1. Normally, the base sheet 31 is an insulating sheet. When the base member 31 is used independently of the base member 1a, the base sheet 31 may be formed of a material having an appropriate electric conductivity and the conductive layer 32 may be omitted.

The conductive layer 32 may be formed of a semiconductor having an electric conductivity that enables the conductive layer 32 to serve as a horizontal electrode to apply an electric field perpendicularly to the PDLC film 33, for example, a semiconductor having a sheet resistivity of $10^{12}$ Ω/sq. or below. However, in view of suppressing voltage loss, it is preferable that the conductive layer 32 has a high electric conductivity. The conductive layer 32 may be, for example, an evaporated metal film or a metal foil of aluminum or the like, a transparent conductive film, such as an ITO film, a conductive paint film containing carbon black, or a layer containing a conductive material dispersed in the layer.

The protective layer 35 protects the PDLC film 33 from pressure, external force and the ambient conditions and enhances the heat resistance, abrasion resistance and scratch resistance of the writable displaying element 30 which are important for the writable displaying element 30 to withstand actions exerted thereon by a thermal head and an electrode roller. The protective layer 35 may be a film of a hardenable resin, such as a thermosetting resin or a radiation-setting resin that hardens when exposed to ultraviolet rays or electron rays, having a thickness in the range of about 0.5 to abut 10 μm. The protective layer 35 may be formed so as to coat, not only the surface of the PDLC film 33, the side surfaces of the PDLC film 33, the conductive layer 32 and the entire area of the surface of the base member 1a on which the writable displaying unit 3 is disposed. When the protective layer 35 is formed so as to coat the entire area of the surface of the base member 1a, it is preferable to use a resin film as the protective layer 35.

The intermediate layer 34 serves as a barrier layer that prevents the permeation of the solvent contained in the material of the protective layer 35 into the PDLC film 33 and the deterioration of the liquid crystal orienting performance of the PDLC film 33 when forming the protective layer 35. The thickness of the intermediate layer 34 is in the range of about 0.5 to about 10 μm. The intermediate layer 34 is formed by spreading an aqueous solution of a water-soluble resin, such as polyvinyl alcohol, polyvinyl pyrrolidone or carboxymethyl cellulose. The intermediate layer 34 increases the degree of freedom in selecting the material of the protective layer 35. For example, the protective layer 35 of a radiation-setting resin, such as a soft urethane acrylate, is excellent in heat resistance, abrasion resistance, scratch resistance, touch to a thermal head and cushioning performance.

The cushion layer 36 formed on the back surface of the base sheet 31 has moderate elasticity and flexibility, and secures satisfactory contact between the reversible displaying element 30 and a thermal head or an electrode. The cushion layer 36 as formed of a heat-insulating material, such as a foam material, prevents the dissipation of thermal energy exerted on the reversible displaying element 30 by a thermal head or the like to heat the reversible displaying element 30 rapidly. The cushion layer 36 may be formed of an elastic resin, such as urethane foam or the like having heat-insulating capability. The thickness of the cushion layer 36 is dependent on the required cushioning and heat-insulating abilities.

The adhesive layer 37 is formed of a generally known adhesive, such as a rubberlike resin or an acrylic resin, and has a thickness in the range of about 20 to about 50 μm.

The information displaying medium 1 employing the reversible displaying element 30 provided with the PDLC film 33 is capable of displaying images in an excellent visibility, ensures security against dishonest alteration and reliability of the information and is capable of being properly used for various purposes. The large information recording capacity of the information recording device 4b and the signal processing ability of the control device 4a enables the information displaying medium 1 to be properly used for various purposes.

The upper base part 51 and the lower base part 52 supporting and storing the reversible displaying element 30, the communication unit 2 including the antenna and the processing unit 4 are sheets, boards or moldings of a resin, such as a vinyl chloride resin or an acrylic resin, or a ceramic material. The shapes of the upper base part 51 and the lower base part 52 are determined according to the purpose and may be that of a card.

A method of erasing information recorded on the PDLC film 33 of the writable displaying unit of the information displaying medium 1 by applying an electric field to the PDLC film 33 and a method of recording information on the PDLC film 33 by applying heat to the PDLC film 33 will be described hereinafter.

Any one of the electric field applying methods disclosed in, for example, Japanese Patent Application No. 6-103249 of the applicant of the present patent application, Japanese Patent Application No. 6-302701, "Noncontact Method of Orienting the Liquid Crystal of a Liquid Crystal Displaying Medium and Liquid Crystal Orienting Apparatus" (charging system), Japanese Patent Application No. 6-302702, "Method of Orienting the Liquid Crystal of a Liquid Crystal Displaying Medium and Liquid Crystal Orienting Apparatus" (electrode system), and Japanese Patent Application No. 6-333820, "Writing Apparatus for writing Information to Reversible Displaying Medium" (charging system and electrode system) may be used.

These previously disclosed electric field applying methods can be classified by various bases of division; the electric field applying methods can be classified into those of a noncontact system and those of a contact system, into those of a charging system and those of an electrode system or into those of a single-electrode system that creates a potential difference across the information displaying medium 1 from one side of the information displaying medium 1 and those of an opposed-electrode system that creates a potential difference across the information displaying medium 1 from the opposite sides of the information displaying medium 1. These electric field applying methods of those systems may be used in combination. An appropriate electric field applying method is selected taking into consideration the shape and the physical properties of the information displaying medium 1. Since the information displaying medium 1 is internally provided with a semiconductor device, an electric field applying method of a single-electrode system that creates a potential difference across the information displaying medium 1 from one side of the information displaying medium 1 is preferable.

Figure 4:
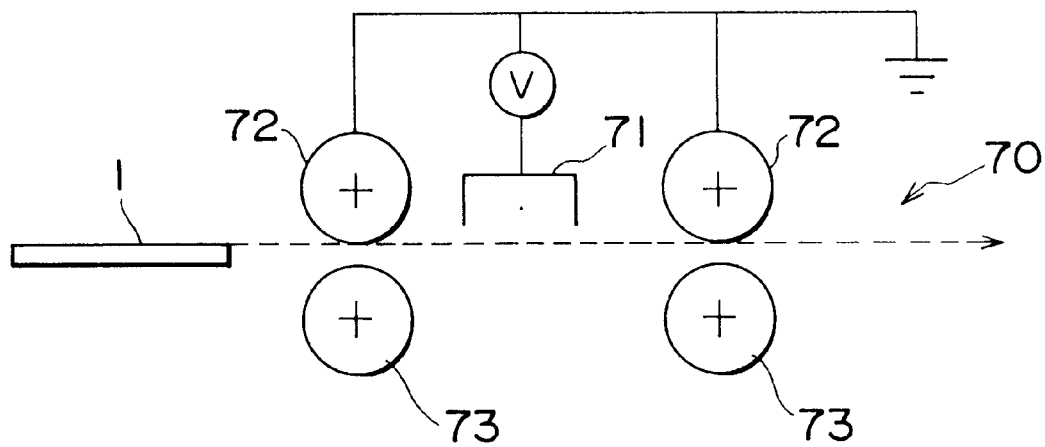
FIG. 4 is a diagrammatic view for assistance in explaining a method of erasing information displayed on an writable displaying unit.

FIG. 4 shows an electric field applying apparatus 70 that applies an electric field to the information displaying medium 1 by the combination of a charging system (noncontact system) and an electrode system (contact system). Referring to FIG. 4, the electric field applying apparatus 70 has two grounded rollers 72 (electrodes) formed of a conductive rubber, and a charging device 71, such as a corona charger, disposed between the grounded rollers 72, and guide rollers 73 disposed opposite to the grounded rollers 72, respectively. The information displaying unit 3 is disposed under the grounded rollers 72 and the charging device 71 and an electric field is applied perpendicularly to the information displaying unit 3. Different electric field applying methods employ different numbers of charging devices 71 or grounded rollers 72.

When the charging device 71 of the electric field applying system shown in FIG. 4 employing the electrodes 72, i.e., grounded rollers, and the charging device 71 is substituted by an electrode which is not grounded and is charged at a potential, a combination of an electrode system, a contact system and a single-electrode system can be constructed. A combination of a charging system, a noncontact system and a single-electrode system can be constructed by substituting the electrodes 72, i.e., grounded rollers, by charging devices. A system employing the electrode 72, i.e., grounded roller, and the charging device 71, a system employing the two electrodes 72, i.e., grounded rollers, and a system employing the two charging devices are possible systems. In any one of those systems, the adjacent electrodes 72 or the adjacent charging devices 71 are charged at different potentials (a ground potential and a positive or negative potential, or a positive potential and a negative potential), respectively.

A thermal head like the thermal print head of a thermal transfer printer is used for heating.

The information displaying medium 1 (commuter ticket) of the present invention can be applied to various purposes in which the capability of the PDLC film 33 displaying information in a high visibility, security against the dishonest alteration of the displayed information and capability of withstanding the repetition of writing cycles are important. The advantages of the information displaying medium 1 as compared with a conventional magnetic commuter ticket will be explained in detail.

Information magnetically recorded on a commuter ticket of a magnetic recording type for use in using transport facilities is read by an automatic ticket examining apparatus as the commuter ticket is passed through the automatic ticket examining apparatus. Therefore, the user needs to carry out a procedure requiring steps of taking out the commuter ticket from the case, inserting the commuter ticket into the automatic ticket examining apparatus, receiving the commuter ticket after the information has been read from and necessary information has been recorded on the commuter ticket by the automatic ticket examining apparatus and returning the commuter ticket into the case. Consequently, the ticket barrier becomes congested when many people use the automatic ticket examining apparatus successively.

When the information displaying medium 1 of the present invention having a semiconductor information recording unit from which information is read and to which information is written by radio is used as a commuter ticket, processing operations can be quickly accomplished and the information recorded on the information recording device 4b is transmitted by radio through the communication unit 2 to the external apparatus 5 at the ticket barrier. Therefore, the information displaying medium 1 need not be taken out from and returned into the case. Since the information displaying medium 1 is not brought into mechanical contact with the external apparatus 5, the information displaying medium 1 is scarcely deteriorated and can be used for an extended period of time. Generally, the term of validity of the commuter ticket is far shorter than the life time of the information displaying medium 1, therefore the recovered information displaying medium 1 can be used again to reduce the cost.

Generally, the term of validity and the like of the commuter ticket need to be displayed in visible images on the commuter ticket. In the magnetic commuter ticket, the term of validity and the like are recorded on the magnetic recording unit in invisible magnetic data, and conditions of use including the date and time of use and the name of the boarding station are recorded on the magnetic commuter ticket every time the commuter ticket is used. It is convenient for the ticket examiner to examine the commuter ticket when the commuter ticket is not examined by an automatic ticket examining apparatus and for the user to confirm the term of validity of the commuter ticket, when visually recognizable information is displayed on the commuter ticket. Therefore, the currently used magnetic commuter ticket is printed with required conditions including the user's name, the commutation section and the term of validity by thermal transfer printing or the like. Since those printed required conditions cannot be rewritten, the commuter ticket is thrown away after the term of validity has expired, and a new commuter ticket is issued.

When using the recovered information displaying medium again after changing the printed information, it is quite troublesome if the display unit needs to be scraped from the information displaying medium and new information needs to be printed on the information displaying medium. Therefore, it is desirable that the information displaying medium is provided with a writable displaying unit that allows repetitive writing. When the information displaying medium is used as a commuter ticket, the information displaying medium must have a function to prevent the dishonest alteration of the recorded information in addition to a function to display the stored information. Therefore, a displaying element that allows repeated information writing and ensures security against the dishonest alteration of the information is desirable.

Since the information displaying medium 1 of the present invention has the writable displaying unit 3 provided with the reversible displaying element 30 having the PDLC film 33, security against the dishonest alteration of the information is ensured and new information can be easily written.

As is apparent from the foregoing description, the information displaying medium 1 of the present invention has capabilities of ensuring security against the dishonest alteration of the information and enabling repetitive writing in addition to capabilities of displaying information in high visibility, exchanging data in a noncontact mode and recording a large amount of information.

The information displaying medium 1 of the present invention is not limited in its practical application to a commuter ticket; the information displaying medium 1 is properly applicable to any purposes requiring capabilities of recording a large amount of information and displaying information in high visibility. The information displaying medium 1 is further effectively applicable to purposes requiring durability and security against the dishonest alteration of information. The advantage of the writable displaying unit is significant because the information displaying medium 1 is provided with an expensive IC module and such and it is desirable to use the information displaying medium 1 repeatedly. Therefore, the information displaying medium 1 is advantageously applicable to purposes in which the information displaying medium 1 is recovered and used repeatedly. Suitable purposes like those mentioned above include membership cards on which important information including the member's name and an ID number assigned to the member is displayed, ski lift ticket on which the term of validity and the like are displayed, and customer cards on which points and the like are displayed every time the customer cards are used.

Examples of the present invention will be described hereinafter.

EXAMPLE

Referring to FIG. 2B, a recess 8 of 20 mm by 60 mm in area and 0.5 mm in depth was formed in a 1.5 mm thick upper base part 51 of a vinyl chloride resin to bury a writable displaying unit 3 having a reversible displaying element 30 therein. A recess 9 for receiving a communication unit 2 and a processing unit 4 therein was formed in the surface of a 1.5 mm thick lower base part 52 of a vinyl chloride resin, and the processing unit 4 comprising a semiconductor storage device and a CPU, and the communication unit 2 including an antenna were buried in the recess 9. After forming a base member 1a by adhesively joining together the upper base part 51 and the lower base part 52 with an adhesive layer 53, the base part 1a was punched in a size of 60 mm by 90 mm to obtain an information displaying medium 1 (commuter ticket) in accordance with the present invention.

The reversible displaying element 30 of the writable displaying unit 3 is provided with a PDLC film 33. A 100 $\mu$m thick polyethylene terephthalate film provided with an ITO film on one surface thereof was used as a base sheet 31. The PDLC film 33 was formed in a thickness of 10 $\mu$m over the entire surface of the ITO film. An aqueous solution of a polyvinyl alcohol resin was spread over the entire surface of the PDLC film 33 to form a 5 $\mu$m thick intermediate layer 34. An ultraviolet-setting resin was spread over the entire surface of the intermediate layer 34 in a film and the film was hardened to form a 5 $\mu$m thick protective layer 35. A 1 $\mu$m thick anchor layer of a polyester resin was formed on the back surface of the base sheet 31 to enhance the adhesive power of the back surface, a 0.4 mm thick cushion layer 36 of a foam urethane resin was formed over the anchor layer, and then a 20 $\mu$m thick adhesive layer 37 of a urethane resin was formed on the cushion layer 36 to complete the reversible displaying element 30 of about 520 $\mu$m in thickness.

PDLC Film

A microcapsulated dispersed coating liquid was prepared by dispersing a liquid crystal (and a dichroic dye) by an in situ polymerizing method using an ultrasonic dispersion process. The liquid crystal is in an irregularly oriented state for a recorded state, and the same is in a regularly (perpendicularly) oriented state for an erased state. The dichroic dye becomes black for a recorded state and becomes transparent for an erased state.

Smectic liquid crystal: S-6, Merk Japan Co.
Dichroic dye: S-428, Mitsui Toatsu Kagaku K.K.
Microcapsules: In situ polymerized methylmethacrylate
Protective colloid/polymer matrix: Polyvinyl alcohol KP-06, Nippon Gosei Kagaku Kogyo K.K.
Thickener/Matrix: Polyvinyl alcohol KH-20, Nippon Gosei Kagaku Kogyo K.K.
Liquid crystal/Matrix Ratio: 1/1

The reversible displaying element thus fabricated is attached adhesively to the bottom surface of the recess 8 of the upper base part 51 to complete an information displaying medium 1 (commuter ticket) in accordance with the present invention. The upper surface of the writable displaying unit 3 extends slightly above a plane including the upper surface of the upper base part 51 or is flush with the upper surface of the upper base part 51 so that the upper surface of the writable displaying unit 3 can be brought into satisfactory contact with a thermal head or the like.

Recording Process

Desired characters were recorded in black on the writable displaying unit 3 with a thermal head in a resolution of 8 dot/mm at a heating rate of 0.18 mJ/dot. A commuter ticket issuing process is completed by writing desired initial data through the communication unit 2 to the information recording device 4b of the processing unit 4.

Writing New Information to Writable Displaying Unit

A voltage of 50 V/pm must be applied across the PDLC film 33 to erase information recorded on the writable displaying unit 3. Since the thickness of the PDLC film 33 in this embodiment is 10 $\mu$m, an electric field of 500 V or above in field intensity must be applied across the PDLC film 33. Therefore, erasing and dishonest alteration of the information recorded on the writable displaying unit 3 is impossible by the natural environment. When changing the information recorded on the recovered information displaying medium 1 to use the recovered information displaying medium 1 again, a voltage was applied across the information displaying medium 1 by the voltage application system using the corona charger 71 and the two grounded rollers 72 shown in FIG. 4 to erase the information recorded on the information displaying medium 1. The voltage of the corona charger 71 was +5 kV and that of the grounded rollers 72 was 0 V.

Comparative Example

A commuter ticket the same as the information displaying medium 1 of the present invention was fabricated. The commuter ticket differs from the information displaying medium 1 only in that the reversible displaying element of the writable displaying unit of the commuter ticket was a polymer/fatty acid dispersed film of a material prepared by dispersing stearic acid and dodecanedioic acid in the copolymer of vinyl chloride and vinyl acetate.

Desired characters were recorded in black on the writable displaying unit with a thermal head in 8 dot/mm at a heating rate of 0.25 mJ/dot. The characters were erased by heating the commuter ticket with a heat roller of 80° C. in surface temperature.

Performance Comparison between Example and Comparative Example

The contrast between the characters and the background on both Example 1 and the Comparative example 1 was not reduced and the visibility of the characters displayed on Example 1 and the Comparative example 1 was satisfactory after 100 writing cycles. The characters recorded on Comparative example 1 faded away and the information displaying unit of Comparative example 1 became transparent when heat of 80° C. was applied to Comparative example 1, and the characters could easily be altered. A high voltage that is unavailable in the natural environment is necessary to erase the characters recorded on Example 1 and the characters written to the PDLC film 33 cannot be erased unless a voltage is applied across the PDLC film 33 by a predetermined method. Since Example 1 needs both heat and an electric field for writing and erasing, the characters are hardly subject to natural fading. Thus, Example 1 is a noncontact information recording/displaying medium capable of ensuring high security against the dishonest alteration of the recorded information.

As is apparent from the foregoing description, since the information displaying medium 1 of the present invention has the writable displaying unit provided with the reversible displaying element 30 employing the PDLC film 3, visible information can be written to the writable displaying element 30 in high visibility. A large amount of information can be stored in the semiconductor information recording device 4b and data can be exchanged in a noncontact mode through the communication unit 2 between the information displaying medium 1 and the external apparatus 5.

Although data can be exchanged in a contact mode in which the conventional IC card capable of storing a large amount of information exchanges data with an external apparatus, the information displaying medium 1 must be provided with exposed terminals to be brought into contact with the terminals of the external apparatus, and the processing unit 4 is liable to be caused to malfunction by the static charging action of an electric field applying device to be used for changing the information recorded on the writable displaying unit. The information displaying medium 1 of the present invention does not need any exposed terminals and hence the processing unit 4 will not be caused to malfunction due to the aforesaid causes. Since the information displaying medium need not be provided with any external terminals, the size and the position of the writable displaying unit 4 can be determined without paying attention to the positions of terminals.

Since the writable displaying unit 3 employs the PDLC film 33, the information displaying medium is excellent in visibility, security of the displayed information, reliability and durability. The information displaying medium having the noncontact data exchanging function is suitable for use as a commuter ticket. The information displaying medium used as a commuter ticket can be recovered and used repeatedly, which reduces the practical costs of the information displaying medium.

Second Embodiment

A second embodiment of the present invention will be described with reference to FIGS. 5 to 10, in which parts like or corresponding to those of the first embodiment shown in FIGS. 1 to 4 are designated by the same reference characters and the description thereof will be omitted.

Figure 5:
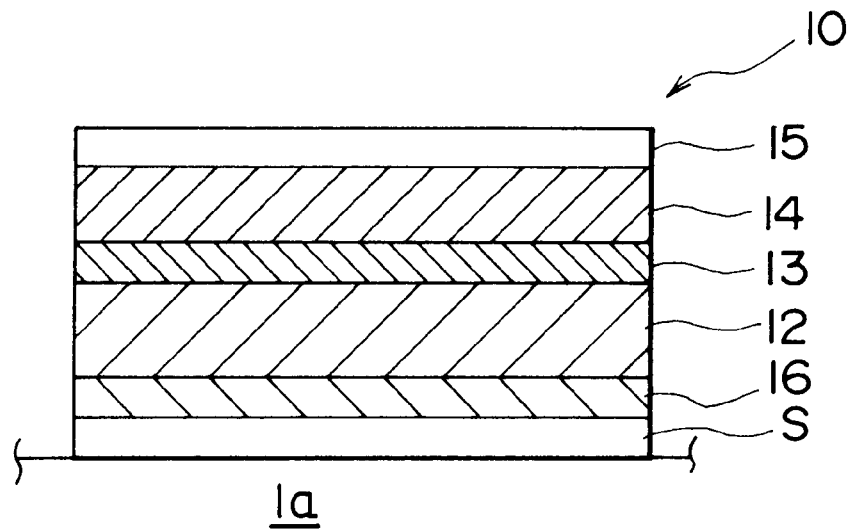
FIG. 5 is a sectional view of a writable displaying labeling sheet in a second embodiment according to the present invention.

Referring to FIG. 5, a writable displaying labeling sheet 10 comprises at least a writable displaying layer (PDLC layer) 14 and a layered structure capable of perpendicularly applying an electric field to the writable displaying layer 14. The most basic layered structure of the writable displaying labeling sheet 10 comprises a conductive adhesive layer 16, a conductive base sheet 12 and the writable displaying layer 14, provided that the base sheet 12, the adhesive layer 16 and a base member la (FIGS. 7A and 7B) for an information displaying medium 1 have appropriate electric conductivities, such as those of metals, sufficient to change information by applying an electric field perpendicularly to the writable displaying layer 14 through the base member 1a, the base sheet 12 and the adhesive layer 16.

Ordinarily, an insulating plastic sheet is used as the base sheet 12 in view of costs. Therefore, a conductive layer 13 is formed on one major surface of the base sheet 12, the writable displaying layer (hereinafter referred to also as "PDLC layer") 14 is formed on the conductive layer 13, and a protective layer 15 is formed on the writable displaying layer 14 to protect the writable displaying layer 14 from damage. The adhesive layer 16 is formed on the other major surface of the base sheet 12. A released paper sheet S is attached to the adhesive layer 16 to protect the adhesive layer 16 and to facilitate handling the writable displaying labeling sheet 10.

Although conductive layers like the conductive layer 13 may be formed so as to overlie and underlie the writable displaying layer 14, respectively, to apply an electric field perpendicularly to the writable displaying layer 14, the conductive layer 13 is formed only on the back surface of the writable displaying layer 14 to enable the local application of an electric field, and an external electrode is used instead of forming a conductive layer overlying the writable displaying layer 14.

Figure 6:
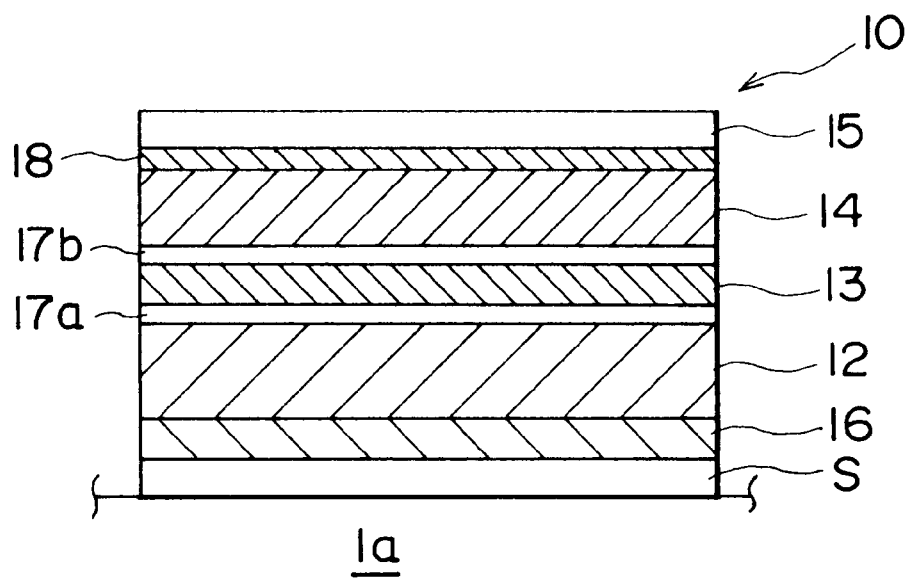
FIG. 6 is a sectional view of a writable displaying labeling sheet in a modified embodiment according to the present invention.

In a structure shown in FIG. 6, adhesive layers 17a and 17b are formed on both the surfaces of the conductive layer 13 to enhance the adhesion between the layers, and an intermediate layer 18 is formed between the writable displaying layer 14 and the protective layer 15 to prevent damaging the writable displaying layer 14 when forming the protective layer 15.

The layers 12, 13, 14, 15, 16, 17a, 17b and 18 of the labeling sheet 10 excluding the released paper sheet S constitute a reversible displaying element 30 (FIG. 3).

The layers will be described starting from the principal layer, i.e., the writable displaying layer 14.

The writable displaying layer 14 may be a polymer/fatty acid dispersed film which needs heat for rewriting (heat-heat mode), a film containing a leuco dye, a film containing a polymer liquid crystal or a film containing microcapsules containing magnetic powder which needs only magnetism for rewriting. A polymer/liquid crystal composite film requiring both heat and an electric field for rewriting is excellent in ensuring security against the dishonest alteration of the recorded information. Although those films have a reversible information recording function to record or erase information in response to external energy exerted thereon, the present invention uses the polymer/liquid crystal composite film that is excellent in security against the dishonest alteration of the recorded information.

The polymer/liquid crystal composite film 14 is made of a material prepared by dispersing a smectic liquid crystal in a polymer matrix and is called a PDLC (polymer dispersed liquid crystal) film. Hereinafter, the polymer/liquid crystal composite film will be referred to as PDLC film.

The principle of recording information on and erasing information from the PDLC film 14 uses light scattering and light transmission (change in the light absorptive power of the dichroic dye when the dichroic dye is used in combination with the liquid crystal and guest-host effect is available) due to the orderly change of the orientation state of the liquid crystal molecules caused by heat and an electric field (heat-electric field mode) between a regular orientation state, i.e., a homeotropic orientation or homogeneous orientation state, and an irregular orientation state, i.e., a random orientation state. When an opaque state (light scattering state) is used as a recording state and a transparent state (light transmitting state) is used as an erased state, information can be written to the PDLC film 14 with a thermal head capable of spot-heating and information can be erased by holding the PDLC film 14 between electrodes.

The PDLC film 14 is most effectively applied to forming an ID card in which the security of the recorded information is important. The orderly orientation state of the PDLC film 14 can be quickly established in a time on the order of microseconds by applying an electric field to the PDLC film 14, the PDLC film 14 withstands a sufficiently large number of writing cycles, the use of the dichroic dye in combination with the liquid crystal displays information in high visibility, the recorded information cannot be easily altered because an electric field of a high field intensity is necessary for rewriting, the recorded information is scarcely subject to natural fading in an natural environment, and the information can be displayed with high reliability.

A PDLC film proposed in, for example JP-A No. 4-71899 may be used as the PDLC film 14. A PDLC film employing a microcapsulated liquid crystal has excellent properties such that the liquid crystal does not exude because the liquid crystal is sealed in microcapsules. Films proposed by the applicant of the present patent application in JP-A Nos. 5-301489, 6-33283, 6-44735 and 6-119702 may be used as the PDLC film 14.

The polymer matrix binding the liquid crystal dispersed therein to form the PDLC film 14 is, for example, a vinyl chloride resin, such as a vinyl chloride resin or a vinyl chloride-vinyl acetate copolymer, a vinylidene chloride resin, an acrylic resin, such as a polymethacrylate resin or an acrylate-methacrylate copolymer, a polyvinyl alcohol resin, a polycarbonate resin, a polyester resin, an epoxy resin, a polyamide resin, a polyurethane resin, a polythiol resin, a radiation-setting resin that sets when exposed to ultraviolet rays or electron rays, or the like.

The liquid crystal employed in the PDLC film 14 may be a smectic liquid crystal, a nematic liquid crystal, a cholesteric liquid crystal, a discotic liquid crystal, a discholesteric liquid crystal, a polymer liquid crystal or a mixture of some of those liquid crystals. The visibility can be improved by mixing the liquid crystal with an appropriate amount of a dichroic dye to enhance the displaying contrast by the guest-host effect.

The liquid crystal can be dispersed in the polymer matrix by any one of a phase separation method, an emulsion method, a microcapsule method, a solvent evaporation method and a suspension polymerization method. Among those methods, a emulsion method and a microcapsule method are most preferable because those methods prevents the liquid crystal from exuding. The microcapsule method improves the durability of the dispersed liquid crystal particles. A microcapsule method using an in situ polymerization process is able to form the PDLC film 14 containing liquid crystal particles of 10 $\mu$m or below in particle size, which is suitable for forming the PDLC film 14 in a practically appropriate thickness and for securing a satisfactory display quality.

Generally, the thickness of the PDLC film 14 is in the range of about 3 to about 23 $\mu$m. The lower limit thickness of the PDLC film 14 is dependent on the displaying contrast and the upper limit thickness of the same is dependent on practical driving voltage necessary for setting the liquid crystal of the PDLC film 14 in a regularly oriented state.

The conductive layer 13 may be formed of a semiconductor having an electric conductivity that enables the conductive layer 13 to serve as a horizontal electrode to apply an electric field perpendicularly to the PDLC film 14, for example, a semiconductor having a sheet resistivity of $10^{12}$ $\Omega$/sq. or below. However, in view of suppressing voltage loss, it is preferable that the conductive layer 32 has a high electric conductivity. The conductive layer 32 may be, for example, an evaporated metal film or a metal foil of aluminum or the like, a transparent conductive film, such as an ITO film, or a conductive paint film containing carbon black or a layer containing a conductive material dispersed in the layer.

The base sheet 12 is a sheet of a synthetic resin, such as a polyester resin, such as polyethylene terephthalate, a polyvinyl chloride resin, a polyolefin resin, such as polypropylene, a cellulose resin or an acrylic resin, a sheet of paper or synthetic paper having a thickness in the range of about 50 to about 1000 $\mu$m. Normally, the base sheet 12 is an insulating sheet, the base sheet 12 may be used also as the conductive layer 13 and the conductive layer 13 may be omitted when the base sheet 12 is semiconductive or non-insulating and capable of functioning to apply an electric field of an appropriate filed strength perpendicularly to the writable displaying layer 14. The base sheet 12 may be processed by a known adhesion improving process, such as corona discharge process.

The protective layer 15 protects the writable displaying layer 14 from pressure, external force and the ambient conditions and enhances the heat resistance, abrasion resistance and scratch resistance of the writable displaying layer 14 which are important for the writable displaying 14 to withstand actions exerted thereon by a thermal head and an electrode roller. The protective layer 15 may be a film of a hardenable resin, such as a thermosetting resin or a radiation-setting resin that hardens when exposed to ultraviolet rays or electron rays, having a thickness in the range of about 0.5 to about 10 $\mu$m. The protective layer 15 may be a resin film or the like.

The adhesive layer 16 is formed of a generally known adhesive, such as a rubberlike resin or an acrylic resin, and has a thickness in the range of about 20 to about 50 $\mu$m. The material of the adhesive layer 16 is selectively determined taking into consideration the properties of the surface to which the adhesive layer 16 is attached.

There is no particular restriction on the material of the adhesive layers 17a and 17b, provided that the adhesive layers 17a and 17b are is able to ensure the close adhesion between the base sheet 12 and the conductive layer 13 and between the conductive layer 13 and the writable displaying layer 14. Suitable materials for the adhesive layers 17a and 17b are, for example, synthetic resins, such as a polyester resin, a urethane resin and an acrylic resin, a silane coupling agent and a titanate coupling agent.

The intermediate layer 18 serves as a barrier layer that prevents the permeation of the solvent contained in the material of the protective layer 15 into the writable displaying layer 14 and the deterioration of the liquid crystal orienting performance of the writable displaying layer 14 when forming the protective layer 15. The thickness of the intermediate layer 18 is in the range of about 0.5 to about 10 $\mu$m. The intermediate layer 18 is formed by spreading an aqueous solution of a water-soluble resin, such as polyvinyl alcohol, polyvinyl pyrrolidone or carboxymethyl cellulose. The intermediate layer 18 increases the degree of freedom in selecting the material of the protective layer 15. For example, the protective layer 15 of a radiation-setting resin, such as a soft urethane acrylate, is excellent in heat resistance, abrasion resistance, scratch resistance, touch to a thermal head and cushioning performance.

The layers 12, 13, 14, 15, 16, 17a, 17b and 18 may be formed by a well-known coating means, such as a gravure coating process, or a well-known printing means, such as a silk-screen printing process, which is suitable for locally forming those layers.

When the transparent state of the PDLC film serving as the writable displaying layer 14 is used for displaying (recording or erasing) state, it is desirable that the layer underlying the writable displaying layer 14 when the labeling sheet 10 is attached adhesively to the base member 1a of the information displaying medium 1, for example, the conductive layer 13, the base sheet 12, the adhesive layer 16 or the base member 1a, has a coloring effect, a light reflecting effect, a light scattering effect or a light diffracting effect. A layer having those effects may be formed under the writable displaying layer 14. When the light scattering effect and the light transmitting effect of the PDLC film 14 is used, it is preferable that the layer underlying the PDLC film 14 is a metallic film having a light reflecting effect, such as a specular reflection layer. When the light absorption spectrum of the dichroic dye and the difference in quantity of absorbed light are used, it is preferable that the layer underlying the PDLC film 14 is a layer having a coloring effect, such as a layer dyed in an optional color, or a layer having a light scattering effect, such as a layer containing a white pigment.

A well-known released sheet S, such as a resin film or a paper sheet, coated with a release agent, is attached to the adhesive layer 16 of the writable displaying labeling sheet 10.

The writable displaying labeling sheet 10 cut in an appropriate shape meeting the purpose is attached to the base member 1a to complete the information displaying medium 1 excellent in ensuring the security of the recorded information and displaying the information with high reliability.

Figure 7A:
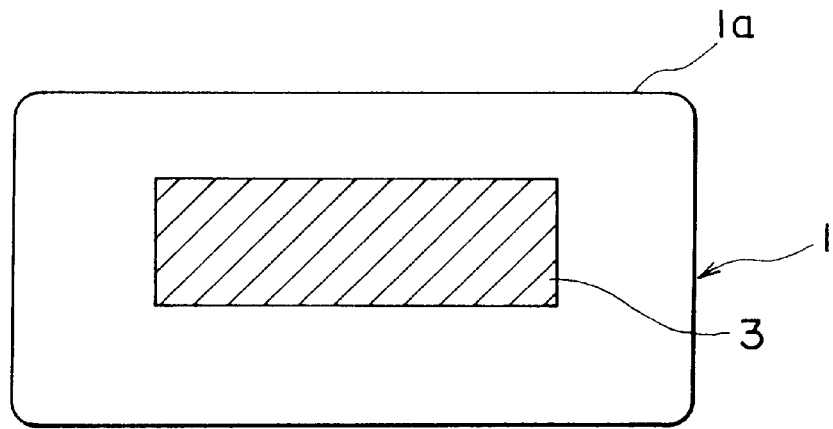
FIG. 7A is a plan view of an information displaying medium in a further modified embodiment according to the present invention.
Figure 7B:
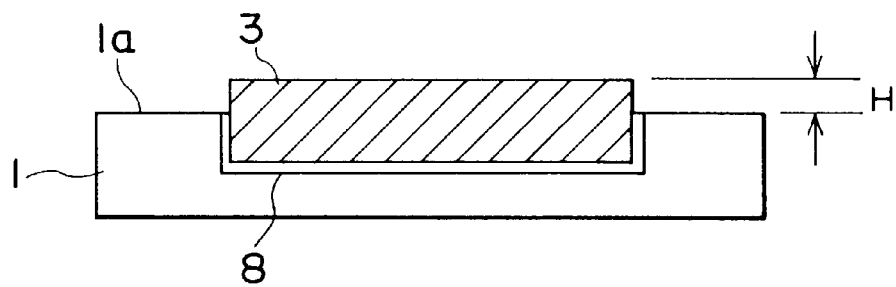
FIG. 7B is a sectional view of the information displaying medium of FIG. 7A.

The information displaying medium 1 of the present invention shown in FIGS. 7A and 7B has the shape of a card. FIGS. 7A and 7B are a plan view and a longitudinal sectional view, respectively, of the information displaying medium 1. Referring to FIGS. 7A and 7B, the information displaying medium 1 comprises the base member 1a, and a writable displaying unit 3 capable of being written and displaying and disposed in a recess 8 formed in the surface of the base member 1a with a small gap between its periphery and the edge of the recess 8. The writable displaying unit 3 is formed by adhesively attaching the labeling sheet 10 to the base member 1a.

The labeling sheet 10 may cover either the entire surface of the base member 1a or a portion of the surface of the base member 1a as shown in FIGS. 7A and 7B. When the labeling sheet 10 covers a portion of the surface of the base member 1a, the labeling sheet 10 is attached adhesively to the bottom surface of the recess 8 formed in the surface of the base member 1a so that the surface of the labeling sheet 10 is substantially flush with the surface of the base member 1a. It is preferable that the surface of the writable displaying unit 3 is at a height H in the range of 0 to 0.5 mm from the surface of the base member 1a as shown in FIG. 7B. When the height H is 0 mm, the surface of the writable displaying unit 3 is flush with the surface of the base member 1a.

If the height H is less than 0 mm, i.e., if the surface of the writable displaying unit 3 is sunk below a plane including the surface of the base member 1a, heat and an electric field cannot be satisfactorily applied to the writable displaying layer 14. For example, when a thermal head is used for heating the writable displaying layer 14, the gap between the thermal head and the writable displaying unit 3 corresponding to the depth of the surface of the writable displaying unit 3 from the surface of the base member 1a reduces the efficiency of heat conduction. A roller electrode or a charger is used as an electric field applying means. When a roller electrode is used for both electric field application and moving the information displaying medium 1, the roller electrode is unable to be in satisfactory contact with the surface of the labeling sheet, an electric field cannot be uniformly applied to the labeling sheet and aerial discharge occurs causing troubles.

Accordingly, it is desirable that the height H of the surface of the writable displaying unit 3 is 0 mm (flush state) or above. When the height H is greater than 0.5 mm, the side surfaces of the writable displaying unit 3 is liable to be exposed to external shocks and the writable displaying unit 3 is liable to be damaged and removed from the base member 1a. The depth of the recess 8 of the base member 1a is dependent on the thickness of the labeling sheet 10 to be disposed in the recess 8.

The writable displaying unit 3 formed by the labelling sheet 10 can be protected from external force by thus burying the labeling sheet 10 in the recess 8 of the base member 1a.

The material, thickness and size of the base member 1a to which the labeling sheet 10 is attached adhesively to complete the information displaying medium 1 are dependent on the purpose for which the information displaying medium is used and not subject to any restriction. For example, when the information displaying medium 1 has the shape of a card, the base member 1a is, in general, a card of a synthetic resin, such as vinyl chloride, a polyester resin, such as polyethylene terephthalate, or a polyolefin resin, such as polypropylene, or a card of paper or synthetic paper. The thickness of the base member 1a is in the range of about 0.1 to 1 mm. The base member 1a may be of any optional shape and may be formed by molding.

The base member 1a may be provided with an information recording part, such as magnetic stripes, for recording invisible information to use the information displaying medium 1 as a writable displaying magnetic card. The information recording part for recording invisible information may be a semiconductor information recording device 4b (FIG. 1), such as an IC storage device or an optical storage device, instead of a magnetic recording layer forming magnetic stripes. Part of the recorded invisible information can be displayed and rewritten by adhesively attaching the writable displaying labeling sheet 10 to an information displaying medium 1 provided with the information recording device 4b to add a displaying function to the information displaying medium 1.

There are restrictions on the positional relation between an IC unit and the labeling sheet 10 when attaching the labeling sheet 10 of the present invention to an IC card. However, those restrictions are removed when the IC card is formed so as to be able to exchange data with an external device by radio in a noncontact mode.

Figure 8:
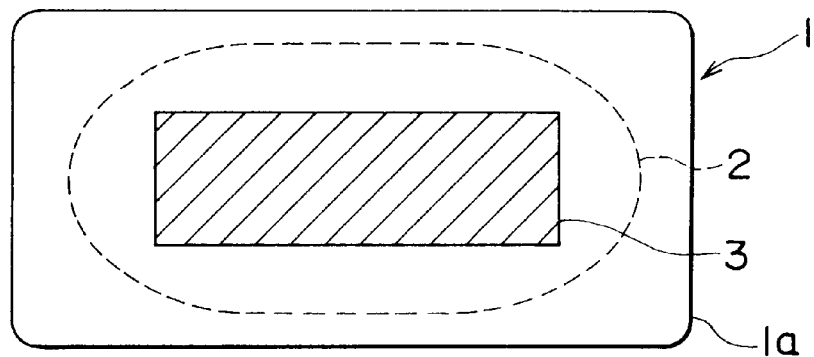
FIG. 8 is a sectional view of an information displaying medium in a further modified embodiment according to the present invention.

As shown in FIG. 8, an information displaying medium 1 provided with an IC may use a predetermined electromagnetic wave to exchange data with an external device. Such an information displaying medium 1 is provided with a communication unit 2 comprising a communication IC device, capacitors and an antenna.

A method of changing the information recorded on the labeling sheet 10 and the information recorded on the information displaying medium 1 formed by attaching the labeling sheet 10 to the base member 1a, using an electric field to erase the information and using heat to record new information will be described by way of example.

Figure 9:
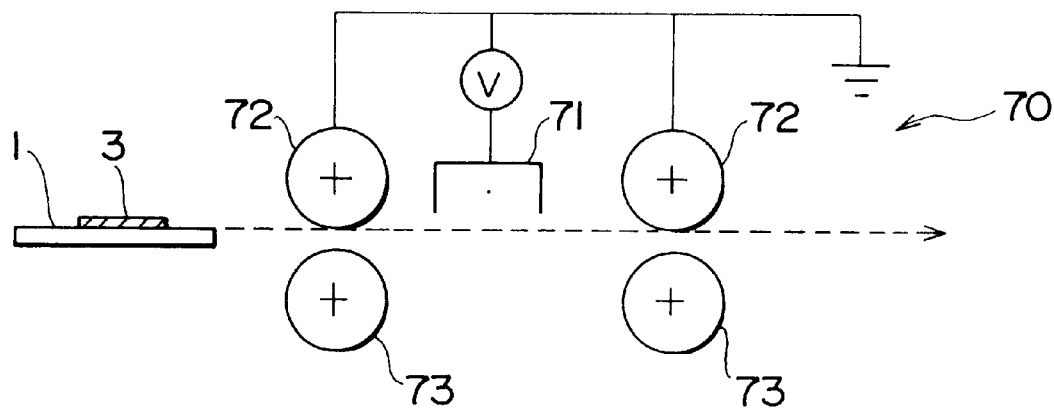
FIG. 9 is a diagrammatic view for assistance in explaining a method of erasing information displayed on a writable displaying unit.

Any one of the electric field applying methods disclosed in, for example, Japanese Patent Application No. 6-103249 of the applicant of the present patent application, Japanese Patent Application No. 6-302701, "Noncontact Method of Orienting the Liquid Crystal of a Liquid Crystal Displaying Medium and Liquid Crystal Orienting Apparatus" (charging system), Japanese Patent Application No. 6-302702, "Method of Orienting the Liquid Crystal of a Liquid Crystal Displaying Medium and Liquid Crystal Orienting Apparatus" (electrode system), and Japanese Patent Application No. 6-333820, "Writing Apparatus for writing Information to Reversible Displaying Medium" (charging system and electrode system) may be used. These previously disclosed electric field applying methods can be classified by various bases of division; the electric field applying methods can be classified into those of a noncontact system and those of a contact system, into those of a charging system and those of an electrode system or into those of a single-electrode system that creates a potential difference across the information displaying medium 1 from one side of the information displaying medium 1 and those of an opposed-electrode system that creates a potential difference across the information displaying medium 1 from the opposite sides of the information displaying medium 1. These electric field applying methods of those systems may be used in combination. An appropriate electric field applying method is selected taking into consideration the shape and the physical properties of the information displaying medium 1. An electric field applying method of a single-electrode system that creates a potential difference across the information displaying medium 1 from one side of the information displaying medium 1 is preferable because this method does not place any restriction on the base member 1a to which the labeling sheet 10 is attached adhesively. FIG. 9 shows an electric field applying apparatus 70 that applies an electric field to the information displaying medium 1 by the combination of a charging system (noncontact system) and an electrode system (contact system). Referring to FIG. 9, the electric field applying apparatus 70 has two grounded rollers 72 formed of a conductive rubber, and a charging device 71, such as a corona charger, disposed between the grounded rollers 72, and guide rollers 73 disposed opposite to the grounded rollers 72, respectively. The information displaying unit 3 is disposed under the grounded rollers 72 and the charging device 71 and an electric field is applied perpendicularly to the information displaying unit 3. Different electric field applying methods employ different numbers of charging devices 71 or grounded rollers 72.

When the charging device 71 of the electric field applying system shown in FIG. 9 employing the electrodes 72, i.e., grounded rollers, and the charging device 71 is substituted by an electrode which is not grounded and is charged at a potential, a combination of an electrode system, a contact system and a single-electrode system can be constructed. A combination of a charging system, a noncontact system and a single-electrode system can be constructed by substituting the electrodes 72, i.e., grounded rollers, by charging devices.

A system employing the electrode 72, i.e., grounded roller, and the charging device 71, a system employing the two electrodes 72, i.e., grounded rollers, and a system employing the two charging devices are possible systems. In any one of those systems, the adjacent electrodes 72 or the adjacent charging devices 71 are charged at different potentials (a ground potential and a positive or negative potential, or a positive potential and a negative potential), respectively.

A thermal head like the thermal print head of a thermal transfer printer, a hot plate or a hot stamp is used for heating.

The writable displaying labeling sheet 10 of the present invention provided with the writable displaying layer 14 comprising the PDLC film makes rewriting for dishonest alteration difficult and enables the labeling sheet 10 to display information that will not be erased by a natural environment.

Since the conductive layer 13 underlies the writable displaying layer 14, the information displayed on the writable displaying layer 14 can be changed by applying an electric field to the writable displaying layer 14 only from one side of the base sheet 12 on which the writable displaying layer 14 is formed. The base sheet 12 serves also as a conductive layer corresponding to the conductive layer 13 when the same is noninsulating.

The information displaying medium 1 may be provided with the labeling sheet 10 covering at least a portion of the base member 1a.

When the labeling sheet 10 is attached adhesively to at least a portion of the recess 8 of the base member 1a, steps are not formed on the surface of the information displaying medium 1 or the height of steps that may be formed by the labeling sheet 10 on the surface of the information displaying means 1 is reduced.

When the height of the surface of the labeling sheet 10 adhesively attached to the base member 1a of the information displaying medium 1 from the surface of the base member 1a is in the range of 0 to 0.5 mm, the side surfaces of the writable displaying unit 3 may not be damaged, and faulty writing to the writable displaying unit 3 will not occur.

When the information displaying medium 1 is provided additionally with an information recording part capable of recording invisible information, such as magnetic stripes, other information can be recorded on and erased from the information displaying medium 1.

A noncontact information recording medium can be obtained by providing the information recording medium 1 with a communication unit 2 capable of exchanging data with an external apparatus 5 (FIG. 1) in a noncontact mode.

Examples of the present invention and comparative examples will be described hereinafter.

Example 1 (Labeling Sheet)

A 100 $\mu$m thick white polyethylene terephthalate sheet was used as a base sheet 12. A 2 $\mu$m thick adhesive layer 17a, a 400 Å thick aluminum layer 13, a 2 $\mu$m thick adhesive layer 17b, an 8 $\mu$m thick writable displaying layer (PDLC film) 14, a 4 $\mu$m thick intermediate layer 15 and a 4 $\mu$m thick protective layer 15 were formed sequentially in that order on one major surface of the base sheet 12. Then, a 20 $\mu$m thick adhesive layer 16 was formed on the other major surface of the base sheet 12 and a released sheet S of glassine paper (Fujimori Kogyo K.K.) was applied to the adhesive layer 16 to complete a writable displaying labeling sheet 10 in accordance with the present invention. The thickness of the labeling sheet 10 excluding the released sheet S was about 140 μm. The contents and methods of forming those layers will be described below.

Adhesive Layers 17a and 17b

Each of the adhesive layers 17a and 17b was formed by spreading a coating liquid containing a polyester resin in a film with a wire bar and heating the film for drying at 100° C.

Aluminum Layer 13

The aluminum layer 13 was formed by depositing aluminum by vacuum evaporation.

Writable Displaying Layer (PDLC Film) 14

A microcapsulated dispersed coating liquid was prepared by dispersing a liquid crystal (and a dichroic dye) in particles of grain sizes on the order of 5 μm by an in situ polymerizing method using an ultrasonic dispersion process. The microcapsulated dispersed coating liquid was spread in a film with a wire bar and the film was dried at a room temperature for 24 hr to form the writable display layer 14. The liquid crystal is in an irregularly oriented state (random orientation) for a recorded state, and the same is in a regularly (perpendicularly) oriented state for an erased state. The dichroic dye becomes black for a recorded state and becomes transparent for an erased state.

Smectic liquid crystal: S-6, Merk Japan Co.

Dichroic dye: S-428, Mitsui Toatsu Kagaku K.K. (black/transparent dichroism)

Microcapsules: In situ polymerized methylmethacrylate

Protective colloid/polymer matrix: Polyvinyl alcohol KP-06, Nippon Gosei Kagaku Kogyo K.K.

Thickener/Matrix: Polyvinyl alcohol KH-20, Nippon Gosei Kagaku Kogyo K.K.

Liquid crystal/Matrix Ratio: 1/1

Intermediate Layer 18

A 10% polyvinyl alcohol aqueous solution (KH-20, Nippon Gosei Kagaku Kogyo K.K.) was spread in a film by bar coating, and the film was dried at 60° C. for 30 sec, and kept at a room temperature to remove the residual moisture.

Protective Layer 15

An ultraviolet-setting resin (soft urethane acrylate resin) was spread in a film by bar coating, and the film was exposed to ultraviolet rays emitted by a 120 W/cm high-pressure mercury lamp to harden the film.

Adhesive Layer 16

A pressure-sensitive acrylic ester (Nissetsu PE-118, Nippon Kabaito Kogyo K.K.) was spread in a film by bar coating and the film was dried.

Example 2 (Information Displaying Medium)

A base member 1a 55 mm by 85 mm was punched out of a 3 mm thick vinyl chloride resin sheet, and a recess 8 31 mm by 71 mm by 140 μm (depth) was formed in a portion of one of the major surfaces of the base member 1a. The labeling sheet 10 in Example 1 was attached adhesively to the bottom surface of the recess 8 so that the surface of the labeling sheet was flush with that of the base member 1a to obtain an information displaying medium 1.

Example 3 (Information Displaying Medium)

An information displaying medium 1 in Example 3 was the same in construction as Example 2, except that the thickness of the base sheet 12 of the labeling sheet 10 of Example 3 was 600 μm while that of the base sheet 12 of the labeling sheet 10 of Example 2 was 100 μm. The height of the surface of the labeling sheet 10 from the surface of the base member 1a was 0.5 mm.

Example 4 (Information Displaying Medium)

A labeling sheet 10 employed in Example 4 was the same as that in Example 1, except that Example 4 used a 50 μm thick sheet of paper as the base sheet and the adhesive layer 17a and the aluminum layer 13 were omitted. The labeling sheet 10 was attached adhesively to a 200 μm thick sheet of wood-free paper not provided with any recess as a base sheet 1a so as to cover the entire surface of the base sheet 1a to obtain an information displaying medium in Example 4, which was the same as Example 2 in other respects.

Example 5 (Noncontact Information Displaying Medium)

A recess 8 31 mm by 71 mm by 0.14 mm (depth) was formed in the central portion of the surface of a noncontact IC card 55 mm by 85 mm by 3 mm (thickness), and a labeling sheet 10 identical with that in Example 1 was attached adhesively to the bottom surface of the recess 8 to obtain an information displaying medium 1, in which the surface of the labeling sheet 10 was flush (H=0) with the surface of the base member 1a.

The noncontact IC card is provided internally with a coil antenna, capacitors, an IC and such. The coil antenna was spaced by 5 mm from the side surface of the IC card. A medium wave was used for data communication.

Comparative Example 1 (Information Displaying Medium)

A 0.14 mm thick labeling sheet 10 provided with an 8 μm thick polymer/fatty acid composite film as the writable displaying layer similar in other respects to Example 1 was fabricated, and the labeling sheet 10 was attached adhesively to the bottom surface of a recess 8 formed in a base member 1a to obtain an information displaying medium 1 in the same manner as that employed in fabricating Example 2.

Polymer/Fatty Acid Composite Film

The polymer/fatty acid composite film was formed by spreading a solution prepared by dissolving a polymer matrix containing 100 parts by weight vinyl chloride-vinyl acetate copolymer, 20 parts by weight stearic acid and 20 parts by weight dodecanedioic acid in tetrahydrofuran as solvent.

Printing Conditions

Characters were printed on the polymer/fatty acid composite film at a heating rate of 0.6 mJ/dot, the printed characters were erased by holding the polymer/fatty acid composite film between hot plates and heating the same at 80° C. for 2 sec.

Comparative Example 2 (Information Displaying Medium)

An information displaying medium 1 in Comparative example 2 is the same as Example 2, in which the thickness of the base sheet 12 is 100 μm, except that Comparative example 2 employed a labeling sheet 10 having a 700 μm thick base sheet 12, and the height of the surface of the labeling sheet 10 from the surface of the base member 1a was 0.6 mm.

Comparative Example 3 (Information Displaying Medium)

A labeling sheet 10 was placed in a 240 μm deep recess 8 formed in a base member 1a so that the surface of the labeling sheet 10 was sunk by 0.1 mm below a plane including the surface of the base member 1a. Comparative example 3 is the same in other respects as Example 2.

Comparative Example 4 (Information Displaying Medium)

In Example 5, the labeling sheet 10 in Example 1 was attached adhesively to the contact IC card provided thereon with an IC mounted by a COB (chip-on-board) method, so as to cover the entire surface of the contact IC card to obtain a contact information displaying medium.

Performance Evaluation

Writing

An opaque state (actually, the dichroic dye assumes a black state) of the writable displaying layer 14, i.e., the PDLC film, was used as a write state. Characters were written to the writable displaying layer 14 by heating the writable displaying layer 14 at a pulse period of 3.0 msec, a duty factor of 50% and a heating rate of 0.4 mJ/dot with a thermal head of 6 dot/mm in resolution Erasing Characters written to the writable displaying layer 14 were erased by an electric field applying apparatus 70 having a corona charger 71 of 5 kV in output capacity and grounded rollers 72 while the writable displaying layer 14 was conveyed at a conveying speed of 500 mm/sec. As shown in FIG. 9, in the electric field applying apparatus 70, the corona charger 71 had a 80 mm long tungsten wire, and the grounded rollers 72 were stainless steel rollers of 10 mm in diameter and 50 mm in length. The grounded rollers 72 were disposed on a conveying path along which the information displaying medium 1 was conveyed at positions above and below the corona charger 71 with respect to the direction in which the information displaying medium 1 is conveyed, respectively, and were spaced by 5 mm from the corona charger 71. The corona charger 71 and the grounded rollers 72 were disposed opposite to the front surface of the information displaying medium 1.

Figure 10:
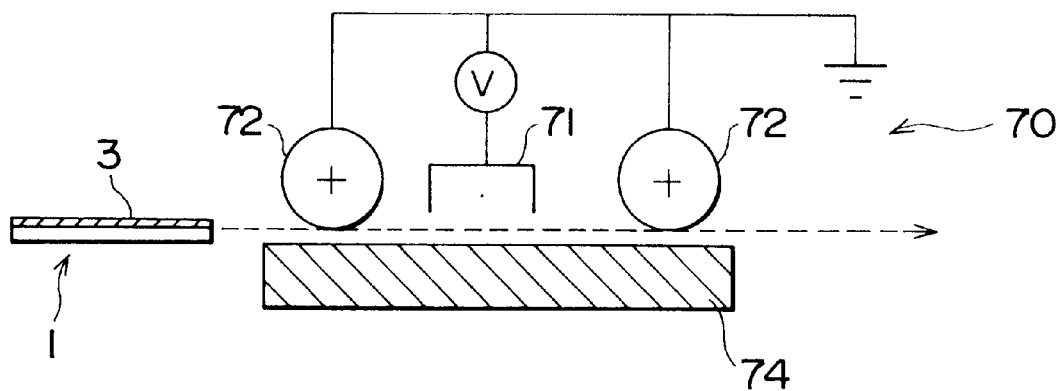
FIG. 10 is a diagrammatic view of assistance in explaining another method of erasing information displayed on a writable displaying unit.

As shown in FIG. 10, an electric field applying apparatus 70 used for writing information to and erasing information from the writable displaying medium in Example 4 has components similar to those of the electric field applying apparatus of FIG. 9 disposed opposite to the front surface of the information displaying medium, and an ungrounded conductive plate 74 fixedly disposed opposite to the back side of the information displaying medium and floating in respect of potential.

The electric field applying apparatus of FIG. 10 drives the information displaying medium 1 for sliding movement along the surface of the conductive plate 74 by the grounded rollers 72 so that the information displaying medium 1 moves under and past the corona charger 71. An electric field to be applied to the PDLC film 14 is created by the potential difference between the corona charger 71 using the conductive plate 74 as a transverse path, and the grounded rollers 72. In FIG. 10, an electric field created between the corona charger 71 and the conductive plate 74 can be applied perpendicularly to the PDLC film 14 in the opposed-electrode system when the conductive plate 74 is grounded. The opposed-electrode system is used for applying an electric field to an information displaying medium having a base member 1a of paper and the electric conductivity of the base member 1a, as compared with that of the writable displaying layer 14, is comparatively small, i.e., the electrical resistance is comparatively large.

Results of Performance Evaluation

Examples 2, 3 and 4

Both the write and the erase operation with the writable displaying layer were satisfactory.

Example 5

Both the write and the erase operation with the writable displaying layer were satisfactory, and data communication between Example 5 and the external apparatus was satisfactory.

Comparative Example 1

Characters written to the writable displaying layer could be erased by putting a hot plate heated at 80° C. into contact with the information displaying medium, and the contents of the displayed information could be easily altered by printing characters after the information had been erased.

Comparative Example 2

The height of the surface of the labeling sheet from the surface of the base member was excessively big, and the labeling sheet came off the base member while the information displaying medium was conveyed and carried around.

Comparative Example 3

The information displaying medium could not be brought into satisfactory contact with the thermal head and characters printed on the information displaying medium were faint and patchy.

Comparative Example 4

Although characters could be satisfactorily printed on the information displaying medium, the information displaying medium malfunctioned in data processing after having been charged for erasing.

Since the writable displaying labeling sheet 10 has the writable displaying layer 14, the information written to the labeling sheet 10 attached to the base member 1a can be changed without changing the labeling sheet 10. Since the writable displaying layer 14 comprises the PDLC film that requires two kinds of external energy, i.e., heat and an electric field, the labeling sheet 10 ensures the excellent security and reliability of the displayed information. The use of the noninsulating base sheet 12 or the use of the conductive layer 13 in combination with the insulating base sheet 12 enables changing the information displayed on the writable displaying unit 3 by the application of an electric field from one side (the side on the front surface) of the labeling sheet 10. Therefore, the base member 1a to which the labeling sheet 10 is attached need not be electrically conductive and there are few restrictions on the material of the base sheet 1a.

Since the information displaying medium 1 can be fabricated by adhesively attaching the labeling sheet 10 to the base member 1a, the labeling sheet 10 can be applied to various purposes for various effects.

The displayed information can be surely and uniformly changed without loss in heat and the electric field by properly attaching the labeling sheet 10 to the base member 1a at an optimum position with the surface of the labeling sheet 10 at an optimum height from the surface of the base member 1a. The information displaying medium can be applied to purposes that requires part of invisible information to be displayed in visible information on or independent information to be held on the information displaying medium. A writable displaying function can be added to an information displaying medium 1 provided with the communication unit 2 capable of exchanging data with an external apparatus in a noncontact mode by attaching the labeling sheet 10 to the information displaying medium 1 without affecting the operation for exchanging a large amount of data between the communication unit 2 and the external apparatus.

Third Embodiment

A third embodiment of the present invention will be described hereinafter with reference to FIGS. 11 and 12, in which parts like or corresponding to those of the second embodiment shown in FIGS. 5 to 10 are designated by the same reference characters and the description thereof will be omitted. The third embodiment employs a transfer sheet 20 instead of the labeling sheet 10, and the third embodiment is substantially the same in other respects as the second embodiment previously described with reference to FIGS. 5 to 10.

Figure 11:
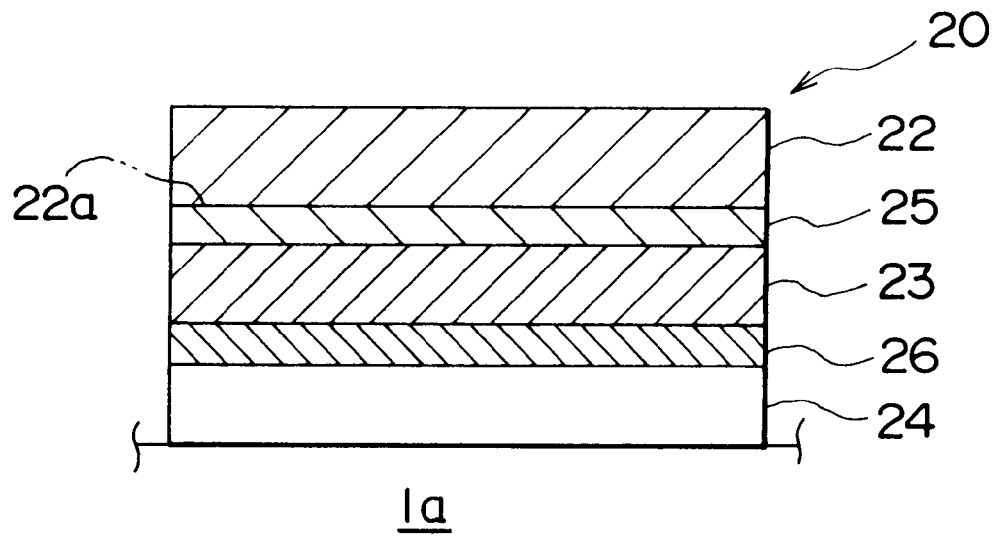
FIG. 11 is a sectional view of a writable displaying transfer sheet in a third embodiment according to the present invention.

Referring to FIG. 11, a writable displaying transfer sheet 20 comprises, as basic components, a removable support member 22, a writable displaying layer 23 (referred to also as "PDLC film") comprising a polymer/liquid crystal composite film and capable of reversibly changing its transmittance or absorptive power by the alternate application of heat and an electric field thereto, and an adhesive layer 24. When the base member 1a of the information displaying medium 1 (FIGS. 7A and 7B) is formed of a material having an appropriate electric conductivity (for example, a metal), i.e., when the base member 1a has an electric conductivity that enables the information displayed on the writable displaying layer 23 to be changed by applying an electric field perpendicular to the writable displaying layer 23 through the base member 1a and the adhesive layer 24, the most basic layered structure does not need any conductive layer.

Preferably, a conductive layer 26 is interlaid between the writable displaying layer 23 and the adhesive layer 24, and a protective layer 25 is interlaid between the writable displaying layer 23, which is exposed after transfer, and the removable support member 22 to enable the use of the transfer sheet 20 in combination with an information displaying medium having an insulating base member 1a.

The writable displaying transfer sheet 20 shown in FIG. 11 is fabricated by sequentially stacking a protective layer 25, the writable displaying layer (PDLC film) 23, a conductive layer 26 and the adhesive layer 24 in that order on the lower surface of a removable support member 22.

Although conductive layers like the conductive layer 26 may be laid over and under the writable displaying layer 23, respectively, to apply an electric field perpendicularly to the writable displaying layer 23, it is desirable to form the conductive layer 26 only on the back side of the writable displaying layer 23 to enable the application of an electric field to optional portions of the writable displaying layer 23. An external electrode or the like may be used for the front surface.

Figure 12:
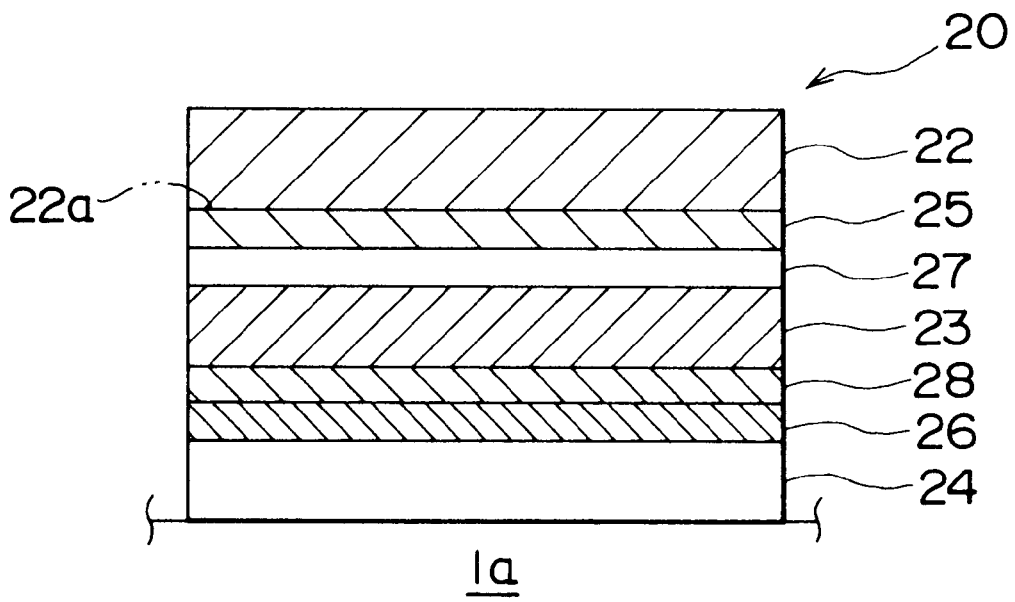
FIG. 12 is a sectional view of a writable displaying transfer sheet in a modified embodiment according to the present invention.

A writable displaying transfer sheet 20 shown in FIG. 12 has, in addition to components like those of the writable displaying transfer sheet 20 shown in FIG. 11, an intermediate layer 27 interlaid between the protective layer 25 and the writable displaying layer 23 to enhance the adhesion between the protective layer 25 and the writable displaying layer 23, and a barrier layer 28 interlaid between the writable displaying layer 23 and the conductive layer 26 to protect the writable displaying layer 23 from damage when forming the conductive layer 26.

The layers 23, 24, 25, 27, 27 and 28 of the transfer sheet 20 excluding the removable support member 22 constitute a reversible displaying element 30 (FIG. 3).

The layers of the transfer sheet 20 will be individually described.

The writable displaying layer 23 may be a polymer/fatty acid dispersed film which needs only heat for rewriting (heat-heat mode), a film containing a leuco dye, a film containing a polymer liquid crystal or a film containing microcapsules containing magnetic powder which needs only magnetism for rewriting. A polymer/liquid crystal composite film requiring both heat and an electric field for rewriting is excellent in ensuring security against the dishonest alteration of the recorded information and in displaying information with reliability so that the information does not fade away in a natural environment. The polymer/liquid crystal composite film that is excellent in security against the dishonest alteration of the recorded information and reliability is used as the writable displaying layer 23 of the transfer sheet 20.

The polymer/liquid crystal composite film is made of a material prepared by dispersing a smectic liquid crystal and the like in a polymer matrix and is called a PDLC (polymer dispersed liquid crystal) film. Hereinafter, the polymer/liquid crystal composite film will be referred to as PDLC film.

The principle of recording information on and erasing information from the PDLC film 23 uses light scattering and light transmission (change in the light absorptive power of the dichroic dye when the dichroic dye is used in combination with the liquid crystal and guest-host effect is available) due to the orderly change of the orientation state of the liquid crystal molecules caused by heat and an electric field (heat-electric field mode) between a regular orientation state, i.e., a homeotropic orientation or homogeneous orientation state, and an irregular orientation state, i.e., a random orientation state. When an opaque state (light scattering state) is used as a recording state and a transparent state (light transmitting state) is used as an erased state, information can be written to the PDLC film 23 with a thermal head capable of spot-heating and information can be erased by holding the PDLC film 23 between electrodes.

The orderly orientation state of the PDLC film 23 can be quickly established in a time on the order of microseconds by applying an electric field to the PDLC film 23, the PDLC film 23 withstands a sufficiently large number of writing cycles, the use of the dichroic dye in combination with the liquid crystal displays information in high visibility, the recorded information cannot be easily altered because an electric field of a high field intensity is necessary for rewriting, the recorded information is scarcely subject to natural fading in an natural environment, and the information can be displayed with high reliability. Thus, the PDLC film 23 has various excellent practical abilities.

A PDLC film proposed in, for example JP-A No. 4-71899 may be used as the PDLC film 23. A PDLC film employing a microcapsulated liquid crystal has excellent properties such that the liquid crystal does not exude because the liquid crystal is sealed in microcapsules. Films proposed by the applicant of the present patent application in JP-A Nos. 5-301489, 6-33283, 6-44735 and 6-119702 may be used as the PDLC film 23.

The polymer matrix binding the liquid crystal dispersed therein to form the PDLC film 23 is, for example, a vinyl chloride resin, such as a vinyl chloride resin or a vinyl chloride-vinyl acetate copolymer, a vinylidene chloride resin, an acrylic resin, such as a polymethacrylate resin or an acrylate-methacrylate copolymer, a polyvinyl alcohol resin, a polycarbonate resin, a polyester resin, an epoxy resin, a polyamide resin, a polyurethane resin, a polythiol resin, a radiation-setting resin that sets when exposed to ultraviolet rays or electron rays, or the like.

The liquid crystal employed in the PDLC film 23 may be a smectic liquid crystal, a nematic liquid crystal, a cholesteric liquid crystal, a discotic liquid crystal, a discholesteric liquid crystal, a polymer liquid crystal or a mixture of some of those liquid crystals. The visibility can be improved by mixing the liquid crystal with an appropriate amount of a dichroic dye to enhance the displaying contrast by the guest-host effect.

The liquid crystal can be dispersed in the polymer matrix by any one of a phase separation method, an emulsion method, a microcapsule method, a solvent evaporation method and a suspension polymerization method.

Generally, the thickness of the PDLC film 23 is in the range of about 3 to about 23 $\mu$m. The lower limit thickness of the PDLC film 23 is dependent on the displaying contrast and the upper limit thickness of the same is dependent on practical driving voltage necessary for setting the liquid crystal of the PDLC film 23 in a regularly oriented state.

The removable support member 22 is a film of a thickness in the range of about 10 to about 50 $\mu$m made of a synthetic resin, such as a polyester resin, such as polyethylene terephthalate, polyvinyl chloride resin, a polyolefin resin, such as polypropylene, a cellulose resin or an acrylic resin. The removable support member 22 may be a synthetic resin film coated with a releasing layer 22a to enable the removable support member 22 to be easily removed from the layer overlying the removable support member 22, for example, the protective layer 25 or the writable displaying layer 23, when transferring the layered structure.

The releasing layer 22a may be formed by spreading a releasing agent, such as wax or silicone, or a thermosetting resin, such as an acrylic resin, containing such a releasing agent. The releasing layer 22a may be formed of a thermoplastic resin, such as an acrylic resin or a melamine resin, or a thermosetting resin.

The adhesive layer 24 is a heat-sensitive adhesive layer that develops adhesive power when applied by heat. A thermoplastic resin having an affinity to the base member 1a of the information displaying medium 1 is selected for forming the adhesive layer 24. Possible thermoplastic resins are, for example, those generally used for forming transfer foils, including acrylic resins and styrene resins. The adhesive layer 24 may be formed by spreading a thermoplastic resin dope by a coating process. A thermoplastic resin dope containing an organic solvent may possibly affect adversely to the orientation of the liquid crystal of the writable displaying layer 23 when the same is applied to the writable displaying layer 23. Therefore, it is preferable to use a thermoplastic resin dope using a water-base solvent, such as an aqueous adhesive emulsion or a water-soluble adhesive polymer. Desirable thermoplastic resins for forming the adhesive layer 24 are those which can be used in aqueous emulsions including, for example, polyester resins, urethane resins, acrylic resins and vinyl acetate resins, and those which can be used in a water-soluble polymer adhesive including polyvinyl alcohols and cellulose derivatives.

When the conductive layer 26 is a metal thin film not having minute pores at all and perfectly impermeable to a solvent, the adhesive layer 24 may be formed by spreading a resin dope prepared by dissolving a resin in an organic solvent.

Ordinarily, the thickness of the adhesive layer 24 is in the range of about 1 to about 3 $\mu$m and is dependent on the material of the base member 1a. The adhesive power of the adhesive layer 24 is insufficient if the thickness is either excessively little or excessively big.

The conductive layer 26 serves as a horizontal conductive path and may be formed of a semiconductor provided that the semiconductor has an electric conductivity high enough (for example, a sheet resistivity of $10^{12}$ $\Omega$/sq. or below) to enable the application of an electric field perpendicularly to the writable displaying layer 23. However, in view of suppressing loss in applied voltage, it is preferable to form the conductive layer 26 having a comparatively high electric conductivity. Preferably, the conductive layer 26 is a metal thin film, such as an evaporated aluminum thin film, a metal film, a transparent conductive film, such as an ITO film, or a conductive resin layer containing conductive powder, such as carbon black or aluminum powder.

The protective layer 25 overlies the writable displaying layer 23 after the layered structure has been transferred to the base member to protect the writable displaying layer 23 from pressure, external force and the environment and to enhances the resistance of the writable displaying layer 23 against heat, abrasion and scratching action that may be exerted on the writable displaying layer 23 by an information writing means including a thermal head, an electrode roller. The protective layer 25 is formed by spreading a hardenable resin, such as a thermosetting resin, an ultraviolet-setting resin or an electron beam resin, in a film of a thickness in the range of about 0.5 to about 10 $\mu$m by a coating process. For example, the protective layer 25 formed of a resin that hardens when exposed to ultraviolet rays or electron rays, such as a soft urethane acrylate resin is excellent in heat resistance, abrasion resistance, scratch resistance, touch to a thermal head and cushioning performance.

As shown in FIG. 12, a primer layer 27 is interlaid between the protective layer 25 and the writable displaying layer 23. A primer layer 27 may be interlaid between a barrier layer 28, which will be described later, and the conductive layer 26 or between the conductive layer 26 and the adhesive layer 24 to enhance the adhesion between those layers. The primer layer 27 may be formed by a simple bonding process, such as a well-known priming process, and there is no particular restriction on the material of the primer layer 27. Possible materials for the primer layer 27 are, for example, synthetic resins, such as polyester resins, urethane resins and acrylic resins, silane coupling agents and titanate coupling agents.

The barrier layer 28 prevents the permeation of the solvent contained in the material of the conductive layer 26 or the adhesive layer 24 into the writable displaying layer 23 and the deterioration of the liquid crystal orienting performance of the writable displaying layer 23 when forming the conductive layer 26 on the writable displaying layer 23 or when forming the adhesive layer 24 directly on the writable displaying layer 23 without forming the conductive layer on the writable displaying layer 23. Although the writable displaying layer 23 is free from the adverse effect of the solvent when the same is coated with the conductive layer 26 of an evaporated metal, the barrier layer 28 is effective in protecting the writable displaying layer 23 from heat that may be applied to the writable displaying layer 23 when forming the conductive layer 26 by evaporation and in serving as a prime coat for forming the conductive layer 26 in a metal thin film having a smooth surface.

When the barrier layer 28 is intended for use as a prime coat, the same may be formed of a heat-resistant thermosetting resin or a heat-resistant thermoplastic resin. However, it is preferable to form the barrier layer 28 of a water-soluble resin in view of eliminating the adverse effect of the solvent on the writable displaying layer 23 when forming the prime coat. Suitable water-soluble resins for forming the barrier layer 28 are, for example, polyvinyl alcohol, polyvinyl pyrrolidone and carboxymethyl cellulose. The barrier layer 28 is formed of such a water-soluble resin by a coating process. A suitable thickness of the barrier layer 28 to develop a barrier effect is in the range of about 0.5 to about 10 μm.

The thickness of the intermediate layer 34 is in the range of about 0.5 to about 10 μm. The intermediate layer 34 is formed by spreading an aqueous solution of a water-soluble resin, such as polyvinyl alcohol, polyvinyl pyrrolidone or carboxymethyl cellulose. The intermediate layer 34 increases the degree of freedom in selecting the material of the protective layer 35. For example, the protective layer 35 of a radiation-setting resin, such as a soft urethane acrylate, is excellent in heat resistance, abrasion resistance, scratch resistance, touch to a thermal head and cushioning performance.

The aforesaid layers may be formed by a well-known coating process, such as a gravure coating process, or a well-known printing process, such as a silk-screen printing process, which is suitable for forming the layers locally within a transfer sheet.

When a transparent state of the PDLC film serving as the writable displaying layer 23 is used as a displaying state (recorded or erased state), it is preferable that the layer lying under the writable displaying layer 23 when the transfer sheet 20 is transferred to the base member 1a of the information displaying medium 1, for example, the conductive layer 26, the barrier layer 28, the adhesive layer 24 or the base member 1a, has a coloring effect, a light reflecting effect, a light scattering effect or a light diffracting effect, or a layer having such an effect may be formed under the writable displaying layer 23. When the light scattering effect and the light transmitting effect of the PDLC film 23 is used, it is preferable that the layer underlying the PDLC film 23 is a metallic film having a light reflecting effect, such as a specular reflection layer. When the light absorption spectrum of the dichroic dye and the difference in quantity of absorbed light are used, it is preferable that the layer underlying the PDLC film 23 is a layer having a coloring effect, such as a layer dyed in an optional color, or a layer having a light scattering effect, such as a layer containing a white pigment.

The writable displaying transfer sheet 20 of an appropriate shape is attached to the base member 1a to form a writable displaying unit 3. The information displaying medium 1 thus fabricated is excellent in the security and reliability of recorded information (FIGS. 7A and 7B). The removable support member 22 is removed after the transfer sheet 20 has been attached to the base member 1a.

The transfer sheet 20 of the present invention may be attached to the base member 1a by a well-known thermopressure process of a pressure roller system or a pressure plate system. Suitable conditions for thermocompression may be determined taking into consideration the adhesive power of the adhesive, the thermal deformation of the base member 1a and the heat resistance of the transfer sheet 20 including the writable displaying layer 23.

The transfer sheet 20 may be cut in half to enable the removable support member 22 to be removed easily after the transfer sheet 20 has been attached to the base member 1a. When cut in half, the transfer sheet 20 can be attached satisfactorily even if the PDLC film 23 is a tough film or the transfer sheet 20 is comparatively thick.

There is no any particular restriction on the material of the base member 1a of the information displaying medium 1 shown in FIGS. 7A and 7B; the base member 1a may be a common plastic sheet. Permanent information may be printed on the base member 1a by a well-known printing means before or after attaching the transfer sheet 20 to the base member 1a. A displaying function can be simply added to an information displaying medium having an invisible information recording unit, such as a magnetic card, an IC card, an optical card or a noncontact IC card, by attaching the transfer sheet 20 to the information displaying medium to obtain an information displaying medium in accordance with the present invention like the information displaying medium 1 shown in FIGS. 7A and 7B.

The base member 1a may be formed in the shape of a card and the base member 1a is, in general, a card of a synthetic resin, such as a vinyl chloride resin, a polyester resin, such as polyethylene terephthalate, or a polyolefin resin, such as polypropylene, or a card of paper. The thickness of the base member 1a is, in general, in the range of about 0.1 to 1 mm. The base member 1a may be of any optional shape other than that of a card and may be formed by molding. The base member 1a may be a paper sheet, a metal sheet or the like, and there is no restriction on dimensions including thickness and material.

The base member 1a may be may be processed by a known adhesion improving process, such as a primer forming process, to enhance the adhesive affinity of the base member 1a to the writable displaying unit 3 (FIGS. 7A and 7B).

The writable displaying unit 3 formed by attaching the transfer sheet 20 to the base member 1a may occupy a portion of the surface of the base member 1a or the entire surface of the base member 1a. When forming the writable displaying unit 3 on a magnetic card or an IC card, the writable displaying unit 3 may be formed, for example, over the magnetic stripes or an information recording unit, provided that the writable displaying unit 3 does not affect the recording and reproducing functions of the information recording unit of the card, such as the magnetic stripes, the IC module or the optical recording film. When forming the writable displaying unit 3 on an IC card, there are restrictions on the positional relation between the writable displaying unit 3 and the terminals of the IC card in view of the adverse effect of an electric field to be used for rewriting. However, the position of the writable displaying unit 3 is not subject to such restrictions when the information displaying medium 1 is of a type that communicates with the external apparatus 5 (FIG. 1) in a noncontact mode by, for example, radio.

When the surface of the base member 1a to which the transfer sheet 20 is attached is formed of a flexible material, transfer pressure applied to the transfer sheet 20 when attaching the transfer sheet 20 to the base member 1a is not concentrated on the writable displaying layer 23, so that the destruction of the shape of the liquid crystal dispersed in the writable displaying layer 23 can be avoided. Possible flexible materials for forming the surface of the base member 1a are low-temperature thermoplastic resins that develop flexibility when heated at temperatures on the order of transfer temperature or foam materials having a cushioning property, such as a material made by foaming a ethylene-vinyl acetate copolymer with an azo compound foaming agent.

Since the writable displaying unit 3 of the information displaying medium 1 in this embodiment is formed by transferring the transfer sheet 20 to the base member 1a, the thickness of the writable displaying unit 3 is less than the writable displaying unit 3 formed by adhesively attaching the labeling sheet to the base member 1a by a thickness corresponding to that of the removable support member 22.

Incidentally, the thickness of the transfer sheet 20 of the present invention is, for example, in the range of about 10 to abut 20 μm and therefore steps are scarcely formed on the surface of the information displaying medium 1 formed by attaching the transfer sheet 20 to the base member 1a by thermal transfer.

The information displayed on the information displaying medium 1 of the present invention is changed by a rewriting method, which is similar to that employed in changing the information displayed on the second embodiment previously described with reference to FIGS. 9 and 10, including erasing the information by electric field application and recording new information by heating.

A hot plate, a thermal head, which is employed in thermal transfer printers and the like, suitable for printing characters and patterns, or a laser heater are used for heating.

The PDLC film 23 employed as a writable displaying means in the writable displaying transfer sheet 20 of the present invention makes the dishonest alteration of the displayed information difficult, is capable of displaying information so that the information may not fade away in a natural environment and enables forming the writable displaying unit 3 in a very little thickness such that the writable displaying unit 3 form protrudes on the surface of the information displaying medium 1. The conductive layer 26 of the transfer sheet 20 for the intermediate displaying medium 1 may be omitted and an electric field can be applied to the information displaying medium 1 from the side of the writable displaying unit 3 to change the displayed information if the surface of the base member 1a to which the transfer sheet 20 is to be attached has a sheet resistance of $10^{12}$ Ω/sq. or below. The transfer sheet 20 provided with the conductive layer 26 may be used if the sheet resistance of the base member 1a is greater than $10^{12}$ Ω/sq. The conductive layer 26 functions as a reflecting layer when the same is a metal thin film or a metallic foil. The conductive layer 26 functions as a black coloring layer when the same is a resin film containing carbon black.

The protective layer 25 protects the writable displaying layer 23 from external force after the transfer sheet 20 has been attached to the base member 1a and gives writable displaying unit 3 heat resistance, abrasion resistance, scratch resistance, satisfactory touch to a thermal head and a cushioning property.

When a water-soluble polymer is used as the polymer matrix of the polymer/liquid crystal composite film of the writable displaying layer 23 and the barrier layer 28 is interlaid between the writable displaying layer 23 and the conductive layer 26, the barrier layer 28 prevents the deterioration of the orienting ability of the liquid crystal contained in the writable displaying layer 23 by the solvent contained in the coating material applied to the writable displaying layer 23. The performance of the barrier layer 28 to prevent the deterioration of the orienting ability of the liquid crystal is particularly high when the barrier layer 28 is formed of a water-soluble polymer. The deterioration of the orienting ability of the liquid crystal can be prevented when the adhesive layer 24 is formed of an aqueous emulsion of an adhesive for the same reason.

Examples and comparative examples of this embodiment will be described hereinafter. The content is expressed in parts by weight or percent by weight unless otherwise specified.

Example 1 (Transfer Sheet)

A 50 μm thick transparent polyethylene terephthalate film having one processed surface processed by a melamine process to give the same a releasing property was used as a removable support member 22. A 2 μm thick protective layer 25, a 0.5 μm thick primer layer 27, a 7 μm thick writable displaying layer 23 (polymer/liquid crystal composite film), a 2 μm thick barrier layer 28, a 400 Å thick conductive layer 26 (evaporated aluminum layer) and a 1 μm thick adhesive layer 24 were formed sequentially in that order on the processed surface of the transparent polyethylene terephthalate film to fabricate a writable displaying transfer sheet 20 in accordance with the present invention.

| Protective Layer 25 (Protective layer forming liquid) | |
|---|---:|
| Ultraviolet-setting resin coating: | 100 parts |
| (DPHA/urethane acrylate = 1/1) | |
| DPHA: Dipentaerythritol hexacrylate | |
| Solvent (Isopropyl alcohol): | 100 parts |
| Primer Layer 27 (Coating Liquid) | |
| Polyester urethane (UR-3200, Toyobo K.K.): | 100 parts |
| Xylene diisosianate: | 3 parts |
| Toluene: | 100 parts |
| Methylethyl ketone: | 100 parts |

Writable Displaying Layer 23 (Writable displaying layer forming liquid)

A coating liquid for forming the writable displaying layer 23 was prepared by the following processes. A liquid crystal mixture was prepared by mixing three parts smectic liquid crystal (S-6, Merk Japan Co.) and 0.06 part dichroic dye (S-428, Mitsui Toatsu Kagaku K.K., Black/transparent dichroism) and stirring the mixture at 70° C. A disperse liquid containing dispersed liquid crystal particles of 5 μm in average particle size was prepared by adding 15.5 parts 10% by weight polyvinyl alcohol (EG-05, Nippon Gosei Kagaku Kogyo K.K.) in the liquid crystal mixture and subjecting the mixture to mechanical dispersion at 70° C. A 10% by weight polyvinyl alcohol aqueous solution of polyvinyl alcohol (KH-20, Nippon Gosei Kagaku Kogyo K.K.) as a thickener was added to the disperse liquid so that the ratio of (smectic liquid crystal S-6)/(polyvinyl alcohol EG-05+polyvinyl alcohol KH-20)=50/50.

Barrier Layer 28 (Barrier layer forming liquid)

Aqueous solution of 10% polyvinyl alcohol (KH-20, Nippon Gosei Kagaku Kogyo K.K.)

Adhesive Layer 24 (Adhesive layer forming liquid)

Aqueous polyester emulsion (MD-1200, Toyobo K.K.)

The layers excluding the conductive layer 26 were formed by the following bar coating process.

The protective layer 25 was formed on the removable support member 22 by spreading the ultraviolet-setting resin in a film on the removable support member 22 and irradiating the film with ultraviolet rays for hardening. Then, the primer layer 27 was formed by spreading the coating liquid in a film and heating the film at 50° C. for one day for bridge formation. Then, the writable displaying layer 23 was formed by spreading the coating liquid in a film, heating the film at 60° C. for 30 sec for drying and leaving the dried film at a room temperature for 24 hr to remove residual moisture. An aluminum film was formed by vacuum evaporation over the writable displaying layer 23, and then the adhesive layer 24 was formed by spreading the adhesive liquid in a film and drying the film at 100° C. for 30 sec.

Example 2 (Information Displaying Medium)

The transfer sheet 20 in Example 1 was attached to a 0.76 mm thick vinyl chloride resin card 1a with magnetic stripes by heating the transfer sheet 20 at 150° C. for 1 sec under pressure, and then the removable support member 22 was removed to form a writable displaying unit 3 of 20 mm by 50 mm on the card 1a to obtain an information displaying medium in Example 2. The height of the surface of the writable displaying unit 3 from the surface of the card 1a was 3 to 5 μm.

Comparative Example 1 (Transfer Sheet)

A transfer sheet in Comparative example 1 was fabricated. The Comparative example 1 is the same in construction and in fabricating method as Example 1, except that Comparative example 1 has a 7 μm thick polymer/fatty acid composite film as the writable displaying layer 23, and a barrier layer 28 of a vinyl chloride-vinyl acetate copolymer (VAGH, UCC Co., U.S.A.).

Polymer/Fatty Acid Composite Film

A coating liquid was prepared by mixing a polymer matrix containing 100 parts by weight vinyl chloride-vinyl acetate copolymer, 20 parts by weight stearic acid and 20 parts by weight dodecanedioic acid, and tetrahydrofuran (solvent). The coating liquid was spread over the primer layer in a film and the film was dried at 140° C. for 1 min to obtain a reversible displaying layer.

Comparative Example 2 (Information Displaying Medium)

An information displaying medium in Comparative Example 2 is the same in construction and fabricating method as the information displaying medium in Example 2, except that Comparative Example 2 employed the transfer sheet 20 in Comparative example 1 instead of the transfer sheet 20 in Example 2.

Printing Conditions

Characters were printed by applying energy at a heating rate of 0.6 mJ/dot to the polymer/fatty acid composite film, and recorded characters were erased by heating the information displaying medium with a hot plate at 80° C. for 2 sec.

Comparative Example 3 (Information Displaying Medium with Labeling Sheet)

An information displaying medium 1 was fabricated by attaching a labeling sheet instead of a transfer sheet to a base member. The labeling sheet was fabricated by sequentially forming a conductive layer, a reversible displaying layer and a protective layer on one major surface of a 0.5 mm thick polyethylene terephthalate base sheet, forming a 50 μm thick adhesive layer on the other major surface of the base sheet, and attaching a 100 μm thick released sheet to the adhesive layer. The rest of the layers of the labeling sheet were the same in material and thickness as the labeling sheet in Example 1.

Adhesive Layer

Acrylic ester pressure-sensitive adhesive (Nissetsu PE-118, Nippon Kabaido Kogyo K.K.)

Released Sheet

Glassine paper (Fujimori Kogyo K.K.)

Performance Evaluation of Recording Medium

Writing

An opaque state of the PDLC film 23 in which the liquid crystal is in a random orientation (actually, the dichroic dye assumes a black state) was used as a write state. Heat was applied to the PDLC film 23 with an end thermal head of 6 dot/mm in resolution at a pulse period of 3.0 msec, a duty factor of 50% and a heating rate of 0.4 mJ/dot.

Erasing

Information recorded on the information displaying medium 1 was erased by applying an electric field to the information displaying medium 1 by the electric field applying apparatus 70 provided with the corona charger 71 of 5 kV in output capacity and grounded rollers 72 while the information displaying medium 1 was conveyed at a conveying speed of 500 mm/sec. The corona charger 71 had an 80 mm long tungsten wire, and the grounded rollers 72 were stainless steel rollers of 10 mm in diameter and 50 mm in length. The grounded rollers 72 were disposed on a conveying path along which the information displaying medium 1 was conveyed at positions above and below the corona charger 71 with respect to the direction in which the information displaying medium 1 was conveyed, respectively, and were spaced by 5 mm from the corona charger 71. The corona charger 71 and the grounded rollers 72 were disposed opposite to the front surface of the information displaying medium 1.

Results of Evaluation

Example 2

Both the write and the erase operation with the information displaying medium were satisfactory.

Comparative Example 2

Characters written to the writable displaying layer could be erased by putting a hot plate heated at 80° C. into contact with the information displaying medium, and the contents of the displayed information could be easily altered by printing characters after the information had been erased.

Comparative Example 3

The height of the surface of the labeling sheet forming the displaying unit from the surface of the base member was excessively big, and the labeling sheet came off the base member while the information displaying medium was conveyed and carried around.

The information displaying medium 1 can be easily obtained by simply attaching the writable displaying transfer sheet 20 of the present invention having the writable displaying layer 23 to the base member 1a. Since the writable displaying layer 23 is a PDLC film that requires two kinds of external energy, i.e., heat and an electric field, to alter the displayed information, the writable displaying unit is able to display information with high security and excellent reliability and in excellent visibility.

Since the transfer sheet 20 can be formed so as to cover the entire surface or a portion of the surface of the base member 1a, and the writable displaying unit 3 formed by the transfer sheet 20 is thin and flat, the writable displaying unit 3 protrudes scarcely from the surface of the base member 1a and hardly comes off the base member 1a. Accordingly, the information displaying medium 1 is highly durable to actions that may be exerted thereon when the same is carried around and to mechanical actions that may be exerted thereon during writing operation.

Since the writable displaying layer 23 transferred to the base member is protected by the protective layer 25, the writable displaying unit 3 of the information displaying medium 1 is excellent in heat resistance, abrasion resistance, scratch resistance, touch to a thermal head and cushioning performance.

When a water-soluble polymer is used as the polymer matrix of the polymer/liquid crystal composite film of the writable displaying layer 23, the barrier layer 28 interlaid between the writable displaying layer 23 and the conductive layer 26 prevents the deterioration of the orienting ability of the liquid crystal of the writable displaying layer 23 by the solvent of the coating liquid applied to the reversible displaying layer in the transfer sheet fabricating process to secure the excellent displaying ability of the writable displaying layer 23. A barrier layer 28 of a water-soluble polymer is particularly excellent in ability to prevent the deterioration of the orienting ability of the liquid crystal. For the same reason, the deterioration of the orienting ability of the liquid crystal can be prevented when the adhesive layer 24 is formed of an aqueous emulsion or a water-soluble polymer adhesive.

What is claimed is:

1. An information displaying medium comprising:
   a base member;
   a semiconductor information recording unit buried in the base member;
   a writable displaying unit formed on the base member and permitting repeated recording and erasing of visible information; and
   a communication means buried in the base member, connected to the semiconductor information recording unit and capable of exchanging signals by radio with an external apparatus;
   wherein the writable displaying unit is provided with a reversible display element that is changed from either of a recording state and an erased state to the other by the agency of an electric field and from the latter state to the former state by the agency of heat.

2. An information displaying medium according to claim 1, wherein
   the semiconductor information recording unit and the communication means are buried in the base member so that the semiconductor information recording unit and the communication means are not exposed.

3. An information displaying medium according to claim 1, wherein
   the visible information to be written to the writable displaying unit is characters or patterns.

4. An information displaying medium according to claim 1, wherein
   the visible information to be written to the writable displaying unit is mechanically readable information.

5. An information displaying medium according to claim 1, wherein
   the reversible displaying element is changed from a recorded state to a erased state by the agency of an electric field.

6. An information displaying medium comprising:
   a base member;
   a semiconductor information recording unit buried in the base member; and
   a writable displaying unit formed on the base member and permitting repeated recording and erasing of visible information, the writable displaying unit being provided with a reversible display element that is changed from either a recording state and an erased state to the other by the agency of an electric field and from the latter state to the former state by the agency of heat;
   wherein the writable displaying unit is disposed in a recess formed in the base member so that the surface of the writable displaying unit is flush with or lies slightly above the surface of the base member.

7. An information displaying medium according to claim 6, wherein
   the height of the surface of the writable displaying unit from the surface of the base member is in the range of 0 to 0.5 mm.

8. An information displaying medium comprising:
   a base member; and
   a writable displaying unit formed on the base member and permitting repeated recording and erasing of visible information; wherein
   (1) the writable displaying unit is provided with a reversible displaying element that is changed from either of a recording state and an erased state to the other by the agency of an electric field and from latter state to the former state by the agency of heat, and
   (2) the reversible displaying element has at least a labeling base sheet formed of a noninsulating material, a writable polymer/liquid crystal composite film formed on an outer side of the base sheet, and an adhesive layer formed on an inner dose of the base sheet so as to be adhesively attached to the base member, the polymer/liquid crystal composite film having a protective layer formed on an outer side thereof.

9. An information displaying medium according to claim 8, wherein
   a semiconductor information recording unit is buried in the base member.

10. An information displaying medium according to claim 8, wherein
    the labeling base sheet is formed of an insulating material, a conductive layer is interlaid between the labeling base sheet and the polymer/liquid crystal composite film, and a protective film is formed on an outer side of the polymer/liquid crystal composite film.

11. An information displaying medium comprising:
    a base member; and
    a writable displaying unit formed on the base member and permitting repeated recording and erasing of visible information; wherein
    (1) the writable displaying unit is provided with a reversible displaying element that is changed from either of a recording state and an erased state to the other by the agency of an electric field and from the latter state to the former state by the agency of heat,
    (2) the reversible displaying element has at least a labeling base sheet, a writable polymer/liquid crystal composite film formed on an outer side of the base sheet, and an adhesive layer formed on an inner side of the base sheet so as to be adhesively attached to the base member, and
    (3) the writable displaying unit is disposed in a recess formed in the base member so that the surface of the writable displaying unit is flush with or lies slightly above the surface of the base member.

12. An information displaying medium according to claim 11, wherein
    the height of the surface of the writable displaying unit from the surface of the base member is in the range of 0 to 0.5 mm.

13. An information displaying medium comprising:
a base member; and
a writable displaying unit formed on the base member and permitting repeated recording and erasing of visible information; wherein
(1) the writable displaying unit is provided with a reversible displaying element that is changed from either of a recording state and an erased state to the other by the agency of an electric field and from the latter state to the former state by the agency of heat;
(2) the reversible displaying element has at least a writable polymer/liquid crystal composite film, and an adhesive layer formed on the inner side of the polymer/liquid crystal composite film to be adhesively attached to the base member;
(3) a conductive layer is interlaid between the polymer/liquid crystal composite film and the adhesive layer; and
(4) the conductive layer is a metal thin film, a metallic foil, a conductive resin or a layer containing a conductive material dispersed in the layer.

14. An information displaying medium comprising:
a base member; and
a writable displaying unit formed on the base member and permitting repeated recording and erasing of visible information; wherein
(1) the writable displaying unit is provided with a reversible displaying element that is changed from either of a recording state and an erased state to the other by the agency of an electric field and from the latter state to the former state by the agency of heat;
(2) the reversible displaying element has at least a writable polymer/liquid crystal composite film, and an adhesive layer formed on the inner side of the polymer/liquid crystal composite film to be adhesively attached to the base member;
(3) a conductive layer is interlaid between the polymer/liquid crystal composite film and the adhesive layer; and
(4) the polymer/liquid crystal composite film is formed of a water-soluble polymer, and a barrier layer is interlaid between the polymer/liquid crystal composite film and the conductive layer.

15. An information displaying medium according to claim 14, wherein
the barrier layer is formed of a water-soluble polymer.

16. An information displaying medium comprising:
a base member; and
a writable displaying unit formed on the base member and permitting repeated recording and erasing of visible information; wherein
(1) the writable displaying unit is provided with a reversible displaying element that is changed from either of a recording state and an erased state to the other by the agency of an electric field and from the latter state to the former state by the agency of heat;
(2) the reversible displaying element has at least a writable polymer/liquid crystal composite film, and an adhesive layer formed on the inner side of the polymer/liquid crystal composite film to be adhesively attached to the base member; and
(3) the adhesive layer is formed of an adhesive aqueous emulsion or an adhesive water-soluble polymer.

17. An information displaying medium comprising:
a base member; and
a writable displaying unit formed on the base member and permitting repeated recording and erasing of visible information; wherein
(1) the writable displaying unit is provided with a reversible displaying element that is changed from either of a recording state and an erased state to the other by the agency of an electric field and from the latter state to the former state by the agency of heat;
(2) the reversible displaying element has at least a writable polymer/liquid crystal composite film, and an adhesive layer formed on the inner side of the polymer/liquid crystal composite film to be adhesively attached to the base member; and
(3) the writable displaying unit is disposed in a recess formed in the base member so that the surface of the writable displaying unit is flush with or lies slightly above the surface of the base member.

18. An information displaying medium according to claim 17, wherein
the height of the surface of the writable displaying unit from the surface of the base member is in the range of 0 to 0.5 mm.

19. A writable displaying labeling sheet comprising:
a labeling base sheet;
a writable polymer/liquid crystal composite film formed on one surface of the labeling base sheet; and
an adhesive layer formed on the other surface of the labeling base sheet; wherein
the labeling base sheet is formed of an noninsulting material, and a protective layer is formed on an outer surface of the polymer/liquid crystal composite film.

20. A writable displaying transfer sheet comprising:
a removable support member;
a writable polymer/liquid crystal composite film formed on the removable support member; and
an adhesive layer formed on the polymer/liquid crystal composite film; wherein
(1) a conductive layer is interlaid between the polymer/liquid crystal composite film and the adhesive layer and
(2) the polymer/liquid crystal composite film is formed of a water-soluble polymer, and a barrier layer is interlaid between the polymer/liquid crystal composite film and the conductive layer.

21. A writable displaying transfer sheet according to claim 20, wherein
the barrier layer is formed of a water-soluble polymer.

22. A writable displaying transfer sheet comprising:
a removable support member;
a writable polymer/liquid crystal composite film formed on the removable support layer; and
an adhesive layer formed on the polymer/liquid crystal composite film, wherein the adhesive layer is formed of an adhesive aqueous emulsion or an adhesive water-soluble polymer.

23. An information displaying medium comprising:
a base member;
a semiconductor information recording unit buried in the base member; and
a writable displaying unit formed on the base member and permitting repeated recording and erasing of visible information;

wherein the writable displaying unit is provided with a reversible display element that is changed from either of a recording state and an erased state to the other by the agency of an electric field and from the latter state to the former state by the agency of heat, the reversible display element including a polymer/liquid crystal composite film and the liquid crystal phase of the composite film containing a dichroic dye that assumes a displaying state by a guest-host effect.

24. An information displaying medium according to claim 23, wherein
the reversible displaying element further comprises a conductive layer formed on an inner side of the polymer/liquid crystal composite film, and a protective layer formed on an outer side of the polymer/liquid crystal composite film.

* * * * *